(12) United States Patent
Merjanian et al.

(10) Patent No.: US 12,718,497 B2
(45) Date of Patent: Aug. 25, 2026

(54) VIRTUAL REALITY ASSISTED SECURITY AND DISTRESS LOCATION DETERMINATION

(71) Applicant: TITAN HEALTH & SECURITY TECHNOLOGIES, INC., Newport Beach, CA (US)

(72) Inventors: Vic A. Merjanian, Newport Beach, CA (US); Serene Zaiss, Los Angeles, CA (US); Ed Merjanian, Newport Beach, CA (US); Eduardo Juarez, Costa Mesa, CA (US); Daniel Wallengren, Huntington Beach, CA (US); Ryan Khalili, Santa Ana, CA (US); Eric Dobyns, Laguna Hills, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 250 days.

(21) Appl. No.: 18/459,948

(22) Filed: Sep. 1, 2023

(65) Prior Publication Data

US 2024/0087254 A1 Mar. 14, 2024

Related U.S. Application Data

(60) Provisional application No. 63/403,249, filed on Sep. 1, 2022.

(51) Int. Cl.
*G06T 19/00* (2011.01)
*G01S 5/02* (2010.01)
(Continued)

(52) U.S. Cl.
CPC .......... *G06T 19/006* (2013.01); *G01S 5/0231* (2013.01); *H04W 4/029* (2018.02); *H04W 4/90* (2018.02); *G06T 2200/04* (2013.01)

(58) Field of Classification Search
CPC .. G06T 19/006; G06T 2200/04; H04W 4/029; H04W 4/90
(Continued)

(56) References Cited

U.S. PATENT DOCUMENTS

2013/0002880 A1* 1/2013 Levinson ............. G08B 25/016 348/E7.085
2018/0364654 A1* 12/2018 Locke ................. H04L 12/2827
(Continued)

*Primary Examiner* — Thomas J Lett
(74) *Attorney, Agent, or Firm* — Sheppard, Mullin, Richter & Hampton LLP

(57) ABSTRACT

Systems and methods are provided for a virtual reality security surveillance system (SSS) to generate a virtual reality map to display virtual reality presentations of a facility. The virtual reality presentations of a facility may display, in real-time, the structure of the facility along with the locations of all devices, persons, incidents, and other objects present in the facility at any given moment in time. The SSS may continuously monitor the facility and locations of devices, persons and incidents in a facility, and update the virtual reality presentations of the facility. In addition to displaying virtual reality presentations, the SSS may detect the presence of new devices and incidents in the facility. The SSS may further communicate with one or more devices to interact with one or more persons in the facility, including providing alerts and/or instructions to the one or more persons regarding any incidents that may concern them.

20 Claims, 9 Drawing Sheets

(51) Int. Cl.
*H04W 4/029* (2018.01)
*H04W 4/90* (2018.01)

(58) Field of Classification Search
USPC .......................................................... 345/419
See application file for complete search history.

(56) References Cited

U.S. PATENT DOCUMENTS

2020/0334470 A1* 10/2020 Abeykoon ............. G06V 10/96
2021/0027360 A1* 1/2021 Shmueli .................. G06F 1/163
2022/0351433 A1* 11/2022 King ...................... G06V 10/82

* cited by examiner

Hardware processors 602

Machine-readable storage media 604

Receiving Data from At Least One Facility Device in a Facility 606

Generating a Virtual Reality Map of the Facility Based on the Received Data 608

Displaying a First Three Dimensional (3D) View of the Facility 610

Determining Locations of Mobile Devices in the Facility 612

Detecting a First Incident Occurred in the Facility 614

Sending an Alert Message to a First Mobile Device of the Mobile Devices 616

Displaying a Second 3D View of a Surrounding Area of the First Mobile Device 618

Receiving a Resolution Alert 620

Updating the First 3D View of the Facility According to the Resolution Alert 622

FIG. 6

VIRTUAL REALITY ASSISTED SECURITY AND DISTRESS LOCATION DETERMINATION

CROSS REFERENCE TO RELATED APPLICATIONS

This application claims the benefit of U.S. Provisional Application No. 63/403,249 filed on Sep. 1, 2022, and which is hereby incorporated herein by reference in its entirety.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. These illustrative examples are mentioned not to limit or define the disclosure, but to provide examples to aid understanding thereof. Additional examples are discussed in the Detailed Description, and further description is provided there.

FIG. 6 is an example computing component that includes one or more hardware processors and machine-readable storage media storing a set of machine-readable/machine-executable instructions that, when executed, cause the one or more hardware processors to perform an illustrative method for implementing virtual reality assisted security and distress location system according to various embodiments of the technology described in the present disclosure.

Figure 1:
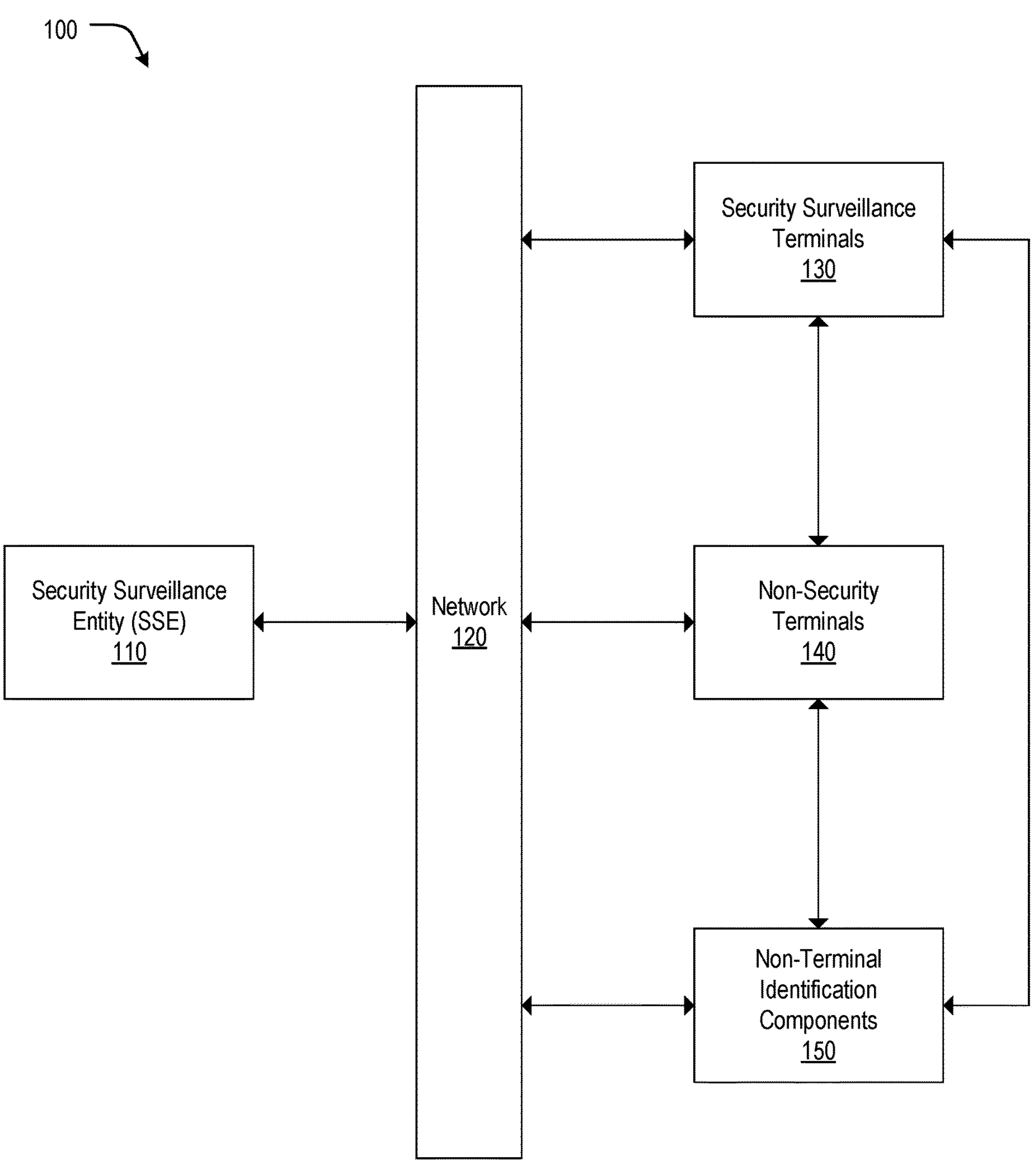
FIG. 1 is a block diagram illustrating an example security surveillance system (SSS) according to various embodiments of the technology described in the present disclosure.

The figures are not exhaustive and do not limit the present disclosure to the precise form disclosed.

DETAILED DESCRIPTION

Current security surveillance systems rely on applications running on user devices (e.g., smartphones, smart watches, etc.) to provide a link between a user and security surveillance administrators. In some solutions, separate devices may be added to enable easier links between the user and security surveillance administrators to better track the location of the user when the user is in a particular facility and establish communication channels between the user and security surveillance administrators.

Such separate devices may also help with triggering an emergency, such as a panic button or other personal device, without the need to open an application on the device and trigger an emergency. These personal devices can send a signal to the mobile device of the user through an application (e.g., over Bluetooth or Wi-Fi), triggering the GPS locator, communication channels, and distress alert function of the application. However, these systems still rely on the mobile device running the application to provide identifying information to the security surveillance system, such as location information. Additionally, these systems still rely on the mobile device running the application to provide security surveillance administrators with real-time visualization of the user's location and surrounding environment in a facility.

When the mobile device is not on the person's person, this can cause several problems to the security surveillance system. One problem is that the security surveillance system will incorrectly determine the person's location, hindering the ability of security surveillance administrators to effectively monitor and assist the user. One such example situation may arise when a person is in one room of a building whereas the mobile device running the application is in another room of the building. In many cases, the wireless connection between the personal device and the application on the mobile device may still be present, enabling the user to trigger an alert from across the building. However, because the location systems of the mobile device are used in determining the user's location, the security surveillance system will misidentify the user as being in another room of the building. As such, security surveillance administrators may provide inaccurate communication to emergency responders and misdirect the emergency responders to the wrong area of the building, increasing the response time and potentially causing confusion and more danger to the person during times of emergency.

A second problem caused from not having the mobile device on the person's person is that it would prevent the security surveillance administrators from accurately determining the user's situation and surrounding environment. The security surveillance administrators will be unable to communicate with the user and the user will be unable to provide details and information of the user's condition and the user's surroundings of their current location. Additionally, the security surveillance administrators will be unable to obtain real-time visualization of the user's location without the user using the mobile device to provide real-time video feedback.

Embodiments of the present disclosure enable more accurate determination of a user's location regardless of whether the user is separated from a device running the security surveillance application. As discussed in greater detail below, embodiments in accordance with the technology discussed herein include security surveillance gateways configured to locate the user, establish communication channels with the user, detect emergency or other incidents that occur within the facility, and detect a distress signal triggered by a panic button or other personal device directly, without the need for the application to serve as an intermediary.

The gateway can use the location of the device running the security surveillance application as a starting point to locating a particular user, and then further use other devices, such as cameras, computers, phones, etc., to determine the exact location of the user. In various embodiments, the gateway may utilize additional information to try and further identify a specific location of the user, obtain real-time visualization of the environment of the user's specific location, and establish a communication channel with the user.

FIG. 1 is a block diagram illustrating an example security surveillance system (SSS) 100 in accordance with embodiments of the technology disclosed herein. As shown in FIG. 1, SSS 100 may include a security surveillance entity (SSE) 110. The SSE 110 serves as a backbone for the SSS 100, providing a variety of services, functionality, and information to the various components connected to the SSS 100. In various embodiments, the SSE 110 includes one or more servers executing non-transitory machine-readable instructions to perform the functions disclosed herein. The one or more servers may be co-located at a data center in some embodiments, while in others the one or more servers may be within a distributed network (e.g., local area network (LAN), wide area network (WAN)). Virtualization may be utilized at SSE 110 to provide virtualized functions or services to the various components of the SSS 100. In various embodiments, SSE 110 may comprise a cloud server, either alone or in combination with one or more dedicated servers.

SSE 110 may be communicatively coupled to a number of other components of SSS 100 through a network 120. In various embodiments, the network 120 may implement one or more communication protocols and include the hardware and software components (i.e., interfaces) required to establish such a communications link. Non-limiting examples of communication protocols that may be implemented within network 120 include: cellular communications protocols (e.g., UMTS, LTE, WiMAX, 3G, 4G, 5G, etc.); wired communications protocols (e.g., cable, DSL, fiber-optic, etc.); wireless communications protocols (e.g., Wi-Fi, Bluetooth®, ZigBee®, near field communication (NFC), etc.). In various embodiments, SSE 110 may be communicatively coupled to one or more databases, components, or entities (not pictured) external to the SSS 100 (e.g., databases of corporate entities or government entities) to exchange information. As a non-limiting example, SSE 110 may obtain information regarding building layouts, locations of emergency infrastructure (e.g., fire hydrants, etc.), employee identification, and other information from a corporate entity, local government entity or entities maintaining a database of such information.

As illustrated in FIG. 1, security surveillance terminals 130 and non-security terminals 140 are connected to SSE 110 through network 120. In various embodiments, security surveillance terminals 130 and non-security terminals 140 comprise mobile devices including one or more processors in the possession of security surveillance and other non-security (respectively) associated with SSS 100. Non-limiting examples of security surveillance terminals 130 and non-security terminals 140 include: smartphones; pagers; tablets; netbooks; laptop computers; smartwatches; heads-up displays (HUDs); identification tags; or any other mobile device. In various embodiments, security surveillance terminals 130 and non-security terminals 140 may include sensor components, including but not limited to: cameras; microphones; speakers; gyroscopes; wireless transceivers and wired communication interfaces enabling one or more communication protocols as discussed with respect to network 120; barometers; global positioning system (GPS) hardware; medical sensors (e.g., electrocardiogram (ECG or EKG)); among other sensor components included within a mobile device.

In various embodiments, security surveillance terminals 130 and non-security terminals 140 may communicate with each other through network 120. In other embodiments, security surveillance terminals 130 and non-security terminals 140 may communicated directly with each other. For a non-limiting example, security surveillance terminals 130 and non-security terminals 140 may detect the presence of another terminal and communicate over a local communications link, for example over Bluetooth®. In another non-limiting example, one or more e security surveillance terminals 130 and non-security terminals 140 may include one or more beacons, which may be detected by another terminal enabling the exchange of information (e.g., the location of the terminal with the beacon).

In various embodiments security surveillance terminals 130 and non-security terminals 140 may run a security surveillance application associated with SSS 100. The security surveillance application may be designed to provide a variety of services or functions of SSS 100, such as the functions/services of locating the security surveillance terminals 130 and non-security terminals 140, establish communication channels with the security surveillance terminals 130 and non-security terminals 140, detect emergency or other incidents that occur within the facility that the security surveillance terminals 130 and non-security terminals 140 are located in, and detect a distress signal triggered from the security surveillance terminals 130 and non-security terminals 140. Using the security surveillance application may provide, distribute, or otherwise convey data obtained via any one or more of the resources within SSS 100 (discussed with respect to FIG. 2). In various embodiments, the security surveillance application is not required to perform one or more of the services discussed herein. For a non-limiting example, a non-security terminal 140 not running the security surveillance application may still transmit and receive information from one or more non-terminal identification components 150 and/or security surveillance terminals 130.

The example SSS 100 of FIG. 1 further includes one or more non-terminal identification components 150. Non-terminal identification components 150 may comprise one or more types of devices and/or items installed within a facility in which a security surveillance is occurring that provide information. Non-limiting examples of non-terminal identification components 150 include: location beacons; proximity sensors; radio frequency identification (RFID) tags; cameras; among others. In various embodiments, non-terminal identification components 150 may include one or more components required for implementing communications protocols, such as those discussed above with respect to network 120. In some embodiments, non-terminal identification components 150 may include a Bluetooth® low energy (BLE) beacon.

Non-terminal identification components 150 provide information external to security surveillance terminals 130 and/or non-security terminals 140. For a non-limiting example, a location beacon may be installed in and associated with room 416 of a corporate building, configured to transmit a signal indicating that the beacon is "room 416". When a security surveillance terminal 130 or a non-security terminal 140 comes within the transmission range of the location beacon, it would pick up the signal and know that it is in room 416. In various embodiments, non-terminal identification components 150 may include one or more indicator components configured to assist a person locate the non-terminal identification component 150. Non-limiting examples of indicator components include lighting elements and/or speakers, among other components which provide a detectable indication of the location of the non-terminal identification component 150 to assist a person to locate the non-terminal identification component 150. As a non-limiting example, non-terminal identification component 150 may be installed next to a fire extinguisher and includes a lighting element that is triggered to activate when a security surveillance terminal 130 and/or non-security terminal 140 is within range. In this way, either person will be able to locate the fire extinguisher in an emergency where visibility may be diminished.

Installing non-terminal identification components 150 facilitates the identification of persons, locations, equipment, layouts, and/or other landmarks prior to an emergency situation or other types of incidents (collectively referred to as "incidents"), to help mitigate the risk associated with an incident. The SSE 110 in some embodiments may store the positional data related to one or more non-terminal identification components 150 in storage media such that display objects may be preconfigured for each non-terminal identification component 150.

In various embodiments, non-terminal identification components 150 may include one or more sensor components for collecting information about the environment. Non-limiting examples of sensor components that may be implemented within non-terminal identification components 150 include: cameras; thermal sensors; smoke detectors; image sensors; infrared image sensors; audio sensors; altimeters; pressure sensors (e.g., barometers); RF sensors; among others. In various components, non-terminal identification components 150 may transmit the information collected by the one or more sensors to SSE 110, security surveillance terminals 130 and/or non-security terminals 140. Including additional sensor components in the non-terminal identification components 150 increases the amount of the information collected about the environment around each non-terminal identification component 150, providing additional context for assessing the situation. The additional sensor components in the non-terminal identification components 150 may also increase the accuracy of the information collected about the location of persons in the facility.

Figure 2:
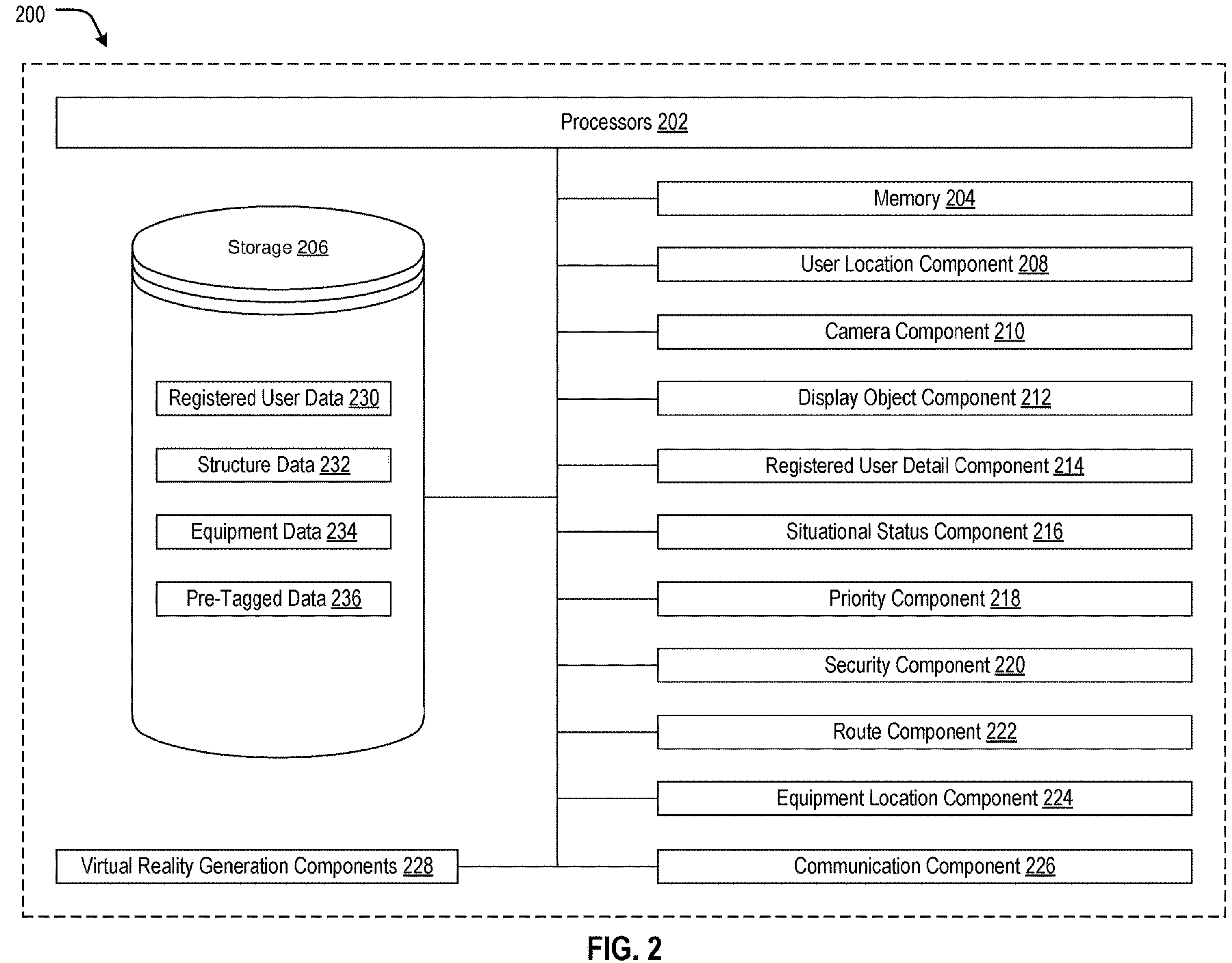
FIG. 2 is a diagram illustrating examples resources of SSS according to various embodiments of the technology described in the present disclosure.

FIG. 2 is a diagram illustrating example resources of security surveillance system 100 in accordance with embodiments of the technology disclosed herein. Each component discussed with respect to FIG. 1 provides one or more resources available within SSS 100. For ease of discussion, FIG. 2 illustrates each type of resource available, not the specific resources available within a particular component. The relationship between the resources of SSS 100 illustrated in FIG. 2 and the various components will be explained during the detailed discussion of each resource.

As shown in FIG. 2, the security surveillance system resources 200 may include one or more processors or processing engines 202 (represented by processor 202), one or more memories (represented by memory 204), and one or more storage units (represented by storage 206). Storage 206 may comprise one or more types of storage device, including but not limited to: a hard disk drive, a magnetic tape drive, USB drive, an optical disk drive, a CD or DVD drive (R or RW), a server storage device (e.g., or other removable or fixed media drive. In various embodiments, storage 206 may comprise a storage area network (SAN) connected to the SSS 100 over network 120, an independent network, or a combination of both. Storage 206 may be used to store a variety of data for use by other resources within security surveillance system resources 200. Storage 206 may store registered user data 230, structure data 232, equipment data 234, and/or pre-tagged data 236. In various embodiments each of this data types may be stored on separate components of storage 206, within separate partitions of the same storage media, or a combination of both. Registered user data 230 comprises details regarding a registered user of SSS 100. In various embodiments, registered user data 230 may include, but is not limited to, name of the registered user, age, height, weight, pre-existing medical conditions, number of registered non-security terminals, among other items regarding the registered user.

Structure data 232 comprises information regarding specific structures (e.g., office buildings, hotels, manufacturing plants, etc.) and/or specific areas (e.g., parks, parking lots, plazas, etc.) where security surveillance is being conducted. In various embodiments, structure data 232 may be pre-stored in storage 206, dynamically obtained through manual entry or from a third-party database, or a combination of both. Non-limiting examples of structure data 232 include: structure layouts, including floors and rooms; location of emergency exits; boiler or other mechanical rooms; main gas, electric, and/or water shut off valves; among others. During an incident, collectively referred to as an "incident," the structure data 232 may be retrieved and utilized to perform the functions discussed in detail with respect to FIGS. 3A-3C, 4, and 5.

Equipment data 234 in various embodiments comprises data regarding the equipment used for security surveillance. Non-limiting examples of equipment data 234 include: type of equipment; operational status of equipment; identification of effective uses; among other information.

In various embodiments, pre-tagged data 236 may comprise information within the vicinity of an incident but which is not categorized under the other types of data, collectively referred to as "landmarks." For example, structure data 232 may not include the location of fire hydrants external to a structure. However, the location of fire hydrants and similar types of municipal infrastructure can be identified prior to any incident developing. In various embodiments, such items may be tagged prior to any incident and stored in storage 206 of the SSS 100 as pre-tagged data 236. The pre-tagged data 236 may include similar information as the equipment data 234, if available. Other non-limiting examples of items that may be pre-tagged include police stations nearby a specific structure or area; hospitals nearby a specific structure or area; known construction sites within the vicinity; transit routes through the vicinity; among others.

Memory 204 may comprise one or more types of machine-readable memory components, including but not limited to read-only memory (ROM) and random access memory (RAM). The memory 204 may provide in various embodiments a cache functionality to security surveillance system resources 200. Memory 204 may be configured with non-transitory machine-readable instructions which, when executed by processor 202, cause SSS 100 to effectuate one or more features discussed below with respect to elements 208-228 (which may be embodied in or effectuated by one or more of security surveillance terminals 130, non-security terminals 140, non-terminal identification components 150, and/or SSE 110). Security surveillance system resources 200 may include one or more of a user location component 208, camera component 210, display object component 212, registered user detail component 214, situational status component 216, priority component 218, security component 220, safety component 222, equipment location component 224, communication component 226, and virtual reality components 228.

In various embodiments, user location component 208 obtains location data of one or more of security surveillance terminals 130, non-security terminals 140, and/or non-terminal identification components 150. In some embodiments, such data may be obtained via location resources (e.g., GPS circuitry, altimeter, barometer, beacons, gyroscope, etc.) local to such terminals, and may be provided to SSE 110 over network 120. Location component 208 may include, but is not limited to, a GPS circuit, an altimeter, a pressure sensor, and other types of position sensors. SSE 110 may broadcast the received location data to each of the other terminals and/or components, while in some embodiments SSE 110 may store the location data in storage 206 and distribute the location data upon request. Location data is indicative of a geospatial location of one or more of security surveillance terminals 130, non-security terminals 140, and/or non-terminal identification components 150.

In various embodiments, user location data may be obtained by the location component 208 through transmission of location data requests to one or more of security surveillance terminals 130, non-security terminals 140, and/or non-terminal identification components 150. In various embodiments, SSE 110 can transmit location data requests over network 120 to the other components, requesting updated information regarding the position of each component. In some embodiments, security surveillance terminals 130 and/or non-security terminals 140 may transmit location data requests to other terminals for updated information on the other terminals' location, or to SSE 110 to request updated location information on all components in SSS 100.

In various embodiments, the location for a security surveillance terminal 130 and/or non-security terminals 140 may be determined using location data from location hardware local to the terminal, location data from external sources (e.g., non-terminal identification components 150), or a combination of both. Within buildings and other structures, GPS signals may be weaker, impacting the accuracy in pinpointing a user's specific location within the structure. Moreover, GPS does not provide vertical positioning, making more accurate positioning of persons within multi-story structures difficult. Knowing which floor a person is on may be vital to rendering safe and efficient assistance. In various embodiments, supplementing location data from a terminal with location data from one or more non-terminal identification components 150 can increase the accuracy of locating persons and incidents in a given facility.

For a non-limiting example, a large office building may implement a version of SSS 100, installing a plurality of non-terminal identification components 150 throughout the building. For ease of discussion, in this example the non-terminal identification components 150 installed are location beacons comprising a BLE circuit. Each location beacon may be configured to transmit a signal comprising location data identifying the location of the beacon. When a non-security terminal 140 comes within range of one or more location beacons, the terminal can receive the signal from the location beacons. The SSS 100 may determine a location of the non-security terminal 140 based on the location data received from the location beacons, in addition to location data obtained by the location hardware of the non-security terminal 140 (e.g., GPS circuitry, etc.). Where the GPS signal is weak (impacting its accuracy), the SSS 100 may determine to use the location of the closest location beacon as the position of the non-security terminal 140 within the building.

In various embodiments, a terminal's position may be determined by the SSE 110, the non-security terminal 140, or responsibility for making the determination may be split between the SSE 110 and non-security terminal 140. In various embodiments, the location data from one or more location beacons may be used to identify the non-security terminal's 140 precise location between the location beacons, while in other embodiments only the location data of the closest location beacon is used as the non-security terminal's 140 position. Whether to use a location beacon's location data as opposed to the location data obtained by local hardware of the non-security terminal 140 may be determined based on a signal strength of the GPS signal at the time in some embodiments.

In various embodiments, the location data of the various non-terminal components 150 may be stored in storage 206 as structure data 232 and/or equipment data 234. Location data may include information identifying specific points of interest within a structure which may be of relevance during an incident, such as emergency exits and equipment. In various embodiments, location data may include information obtained from outside sources, such as from government, corporate, or other databases maintaining information on the structure (e.g., blueprints, structural diagrams, emergency action plans, etc.), which may be stored as structure data 232 and/or equipment data 234 in storage 206. The structure data 232 and/or equipment data 234 may be distributed across memory components of the SSE 110, security surveillance terminals 130, non-security terminals 140, and/or non-terminal identification components 150 in various embodiments. This way, location information available to SSS 100 may be enhanced with as much detail as desired for a given application or as desired by a given implementer of SSS 100.

In still a further non-limiting example, and as discussed further hereafter with respect to equipment location component 224, in various embodiments non-terminal identification components 150 may include location beacons, proximity sensors, receivers, RFID tags, or any of the elements discussed herein with respect to terminals (e.g., GPS circuit, altimeter, barometer, etc.), installed in an indoor location where a piece of usable equipment is stowed within the building, and/or an outdoor location where a piece of usable equipment is kept. Such equipment may include, for example, a surveillance camera, a phone terminal, a monitor, a fire alarm, a smoke detector, a carbon monoxide detector, a fire hydrant, a hose, a rope, a fire extinguisher, an epinephrine pen (EpiPen), an axe, an oxygen mask, a defibrillator, a hose, etc. In some instances, such location beacons, proximity sensors, receivers, RFID tags, GPS circuits, altimeters, barometers, etc. may be affixed to the item of equipment itself (or the housing or casing associated with such equipment) and may provide location data to SSE 110, security surveillance terminals 130 and/or non-security terminals 140 to provide an indication of equipment in the vicinity. In some embodiments one or more non-terminal identification components 150 may embody any and all of the technology and features discussed herein with respect to non-security terminals 140, but instead of being associated with a user, the components are associated (and in some instances mechanically coupled) with a piece of equipment.

In various embodiments, the security surveillance application may utilize, operate, and/or control one or more security surveillance system resources 200, including resources local to SSE 110, security surveillance terminals 130, non-security terminals 140, and/or non-terminal identification components 150. As a non-limiting example, the security surveillance application may operate a camera component 210 of a security surveillance terminal 130, non-security terminal 140, or non-terminal identification component 150 to capture a portion of a real-world scene within the field of view of the camera lens and CMOS array of the respective device.

Security surveillance systems resources 200 may further include a display object component 212 in various embodiments. Display object component 212 may define display objects that may identify the location of one or more of security surveillance terminals 130, non-security terminals 140, and/or non-terminal identification components 150. A display object may include any graphic (e.g., a pin, a bubble, a tile) that may be displayed on an electronic display. Display object component 212 may determine when a portion of a real-world scene captured by a camera component 210 of a security surveillance terminal 130, a non-security terminal 140, and/or non-terminal identification component 150 captures a region of space wherein another terminal and/or one or more non-terminal identification components 150 are located. As the field of view of the camera component 210 may change as the user pans across or moves within an area, display object component 212 may be configured in various embodiments to cause the display objects to display additional objects (e.g., other terminals and/or equipment) captured in the changing field of view while removing those objects no longer within the field of view. The display objects may be overlaid on the real-world scene captured by the camera component 210, augmenting the real-world image with additional information helpful during security surveillance.

Registered user detail component 214 obtains information stored in a user profile for one or more registered users. Such information may be provided by a user when first creating a user profile upon registering with SSS 100 (e.g., registration and sign-up via the security surveillance application). Such information may include the user's name, age, gender, height, weight, contact information (phone, email, etc.), contact information preferences, emergency contact information, family information (spouse, children, siblings, parents, etc.), employment information, skillset, completed emergency response trainings (e.g., CPR certified, tactical training, bomb deactivation training), health conditions or tendencies (e.g., diabetes, asthma, claustrophobia, etc.), physical disabilities (e.g., visually impaired, hearing impaired, paraplegic, etc.). Such information may also include a categorical designation. The categorical designation may be as simple as selecting either an "emergency responder" (e.g., responder) category or a "standard user" category (e.g., non-responder). Such information may further include details about the device the user designates as their primary terminal—e.g., emergency responder terminal, non-responder terminal. Any and all such information may be stored in any electronic storage available to SSS 100, such as in a registered user data 230 sector of storage 206.

In some embodiments, security surveillance terminals 130 and non-security terminals 140 are distinguished from one another by the category of registered users with which they are associated as stored in the user profiles for the one or more registered users. According to some embodiments, security surveillance terminals 130 are associated with a category of registered users designated as security surveillance responders (e.g., persons or other entities charged with responding to a situation involving security and/or safety, resolving an incident situation, or assisting others who are involved in an incident situation). According to some embodiments, non-security terminals 140 are associated with a category of potential target (e.g., a standard user of or subscriber to SSS 100).

Security surveillance responders may include public persons, groups, or entities. For instance, public security surveillance responders might include: a private security organization, a security department, a person security officer or group of security officers; a police department, a division of a police department (e.g., a task force, bomb squad, etc.), a person police officer or group of police officers; a fire department, a division of a fire department, a person fireman or group of firemen; a federal law enforcement agency (FBI, CIA, etc.), a division of a federal law enforcement agency, or a person field officer or team of field officers; a local poison control department, a division of a local poison control department, a person poison control agent or group of agents; or any other public entity, person, or group of persons designated as such, and the like. Security surveillance responders may also include private persons, groups, or entities. For instance, private security surveillance responders might include security guards, property patrolmen, or any other private entity, person, or group of persons designated as such, and the like.

In some embodiments, the security surveillance responders category may be further divided into subcategories that have different privileges, permissions, or capabilities to interact with and control one or more aspects of SSS 100. In some embodiments the subcategories may correspond to the hierarchical structure relevant to a group of security surveillance responders. For example, the security surveillance responders in a particular scenario might include a local police task force. The task force might be made up of one commander, one managing officer that reports to the commander, and five field officers that report to the managing officer. In such a scenario, subcategories might include: "commanders," "managing officers," and "field officers," with descending privileges, permissions, or capabilities to interact with and control one or more aspects of SSS 100. Various applications will be made apparent upon review of the entire disclosure herein.

According to some embodiments, non-security terminals 140 are associated with any non-security responder category of registered users, which may include but not be limited to registered users or entities that are in danger, are involved in an incident situation, or which are otherwise in need of assistance from a security surveillance responder. Just as security surveillance responders may be further divided into subcategories that have different privileges, permissions, or capabilities to interact with and control one or more aspects of SSS 100, so to can the non-security responder category. For instance, if a school campus were to adopt an embodiment of SSS 100 and the school campus were to be under lockdown because of a bomb threat, the subcategories of registered users within the non-security responder category may include the school's dean, administrators, teachers, students, and visitors. Each may be given different privileges, permissions, or capabilities to interact with and control one or more aspects of SSS 100. Various applications will become apparent upon review of the entire disclosure herein.

Situational status component 216 obtains situational status information in real-time from security surveillance responder terminals 130, non-security terminals 140, and/or non-terminal identification components 150 in incident situations. Situational status information may include any information that provides additional context about the nature of the situation within the vicinity of a given user—e.g., number of other persons in the same vicinity as the user with either terminal 130, 140, an injury sustained by the user (or a person in the vicinity of the user), a reaction being experienced by the user (or a person in the vicinity of the user), an incident or event occurring in the vicinity of the user, a request for specific type of help needed or number of responders needed, and/or images, sounds, or video of the vicinity.

Such situational status information may be provided as preconfigured messages/data the user can automatically send by tapping or otherwise selecting an associated buttons, icon or tile from their emergency management application, for example, or may be customized messages/data the user types or records into their unit via their emergency management application, for example. Examples of buttons, icons, or tiles that may be useful to transmit preconfigured messages via the target terminal version of the app may include one or more of the following: "CPR Needed," or "Immobilized," or "Children in Vicinity," "Move on to other targets," and the like. Example customized messages the non-security terminals 140 may transmit may include messages typed by the user of the unit, such as: "There is a person in my vicinity in need of CPR, please send CPR certified emergency responder as soon as possible," or "I am in the vicinity of the incident but there is a clear path for my escape, no need to assist me, move on to others," or "I am trapped and cannot find an exit," or, "I've injured my leg and am immobile, please send two or more security surveillance responders to carry me out," or "the smoke from the fire is becoming unbearable, people around me are losing consciousness and I expect I will shortly too," and the like.

Examples of buttons, icons, or tiles that may be useful for the security surveillance terminal version of a security surveillance application may include one or more of the following: "Send additional responders," or "Mission Assignment Completed," or "Available for New Mission Assignment," and the like. Example customized messages the emergency responder terminals may transmit may include messages typed by the user of the unit, such as: "I need three more emergency responders at my present location," or "The person I came to assist was passed out when I arrived, please send another responder with medical training within the next 10 minutes," or "the south exit of the building is blocked by a pillar that has fallen in front of the exit," and the like. Further discussion of such functionality and graphical user interfaces (GUIs) is provided within the Incorporated References.

In various embodiments, situational status information may include environment data obtained through one or more sensor components of security surveillance terminals 130, non-security terminals 140, and/or non-terminal identification components 150. The sensor components may include those sensor components discussed with respect to FIG. 1. By collecting information through one or more different sensors, SSS 100 can supplement the location data of the various entities with more context as to the actual situation. For a non-limiting example, a non-terminal identification component 150 may include a heat or thermal sensor. The non-terminal identification component 150 can detect heat in the vicinity of the component, and provide that information to SSE 110, security surveillance terminal 130, and/or non-security terminal 140. Using this information, SSS 100 may be configured to identify a fire in the vicinity of the non-terminal identification component 150, enabling SSS 100 to determine whether a particular route is a safe path away from an emergency.

Situation status component 216 may actively inquire about such situational status information (e.g., transmit requests for information), may passively remain open to receiving any such information that is transmitted by a unit (e.g., a receiver configured to receive signal transmissions from units), or both.

Priority component 218 may determine a priority for one or more non-security terminals 140 among a plurality of non-security terminals 140. Priority may be determined by applying one or more predefined priority criteria, such priority criteria based upon one or more of user location information, equipment location information, registered user detail information, and situational status information. Priority criteria may be defined in any manner. For example, priority criteria may include an expression that computes a weighted score for each non-responder terminal under consideration and rank the imminence of the need to assist the user based on the score. For example, a priority criterion may be given by the expression.

For example, suppose that an implementation of SSS 100 considers two different factors in determining priority. Suppose, in this example, that Factor1 represents a score based on the time within which assistance must be rendered, and Factor2 represents a score based on whether there are children in the vicinity of a responder or not. Such scores and/or scoring criteria may be preset or otherwise predefined and stored within SSS 100.

Based on the priority scores computed by SSS 100, SSS 100 may determine that, as between three target terminals, Terminal A, B, and C, Terminal A is the first priority (with the highest priority score), Terminal B is the second priority (with the second highest priority score), and Terminal C is the third priority (with the lowest priority score). SSS 100 may allocate assignments for security surveillance responders to be dispatched to the aid of the non-security terminals in accordance with the priority determined among the plurality of units under consideration for a given application. The SSS 100 may continue to monitor and provide assistance to each target terminal regardless of their priority scores.

Security component 220 may dispatch assignments to a candidate security surveillance responder by matching candidate security surveillance responders with a person in need of assistance and/or an area in need of inspection and may issue a notification or other messages to the security surveillance responder through a security surveillance terminal 130, and/or to the person through a non-security terminal 140. Security component 220 may determine which one or more security surveillance responders should be dispatched to inspect an area or assist one or more persons in need of assistance, and such determination may be determined on any one or more of: a location of a candidate security surveillance responder terminal 130, a location of an area in need of inspection, a location of an incident, a location of a non-security terminal 140 in need of assistance, a location of a piece of equipment, a priority among a plurality of persons, one or more pieces of information stored in a user profile for one or more registered users (either or both of security surveillance responders or persons associated with security surveillance responder terminals 130 and non-security terminals 140), or any information derived from the foregoing (e.g., absolute distance or route distance between a given security surveillance terminal 130 and a given non-security terminal 140). Security component 220 may, in accordance with one or more embodiments, further receive feedback from a registered user (e.g., a security surveillance responder, a person, etc.) indicating the need for additional assistance for a particular assignment, or the need for a reassignment for one reason or another. SSS 100 may automatically make an additional assignment (e.g., summon another security surveillance responder), make a new assignment, or modify an assignment based on the feedback and further based on other information available to it. The other information available to SSS 100 and which may be used for determining an additional assignment, new assignment, or modification to an assignment may include: (i) nearby security surveillance responders available to assist, (ii) nearby security surveillance responders with a given skillset or with a given capability, (iii) nearby persons able to assist, etc.

Route component 222 may determine one or more routes providing possible paths of travel that a security surveillance responder may follow in order to reach the non-security terminal 140. Route component 222 may draw upon map information stored within SSS 100 (e.g., within storage 206) or otherwise accessible to SSS 100 (e.g., via a map database accessible online) to determine and/or provide a route upon which the security surveillance responder may travel to reach the non-security terminal 140. Route component 222 may also determine and/or provide a route upon which the non-security person may travel to reach a place of safety. Such map information may be based on building information (e.g., stairwell locations, elevator bays, escalators), online map information (e.g., google maps information). The route provided may be a walking route, driving route, bicycle route, or any route suitable for any mode of travel (escalator route, elevator route, etc.) or any combination of the foregoing. The determined route or routes may be displayed as an overlay on a portion of a real-world scene captured by a camera component 210 of one or more security surveillance terminals 130, non-security terminals 140, and/or non-terminal identification components 150, or may be provided as a list of visual instructions, a list of audio instructions, or in any other format or manner desired. In some embodiments, multiple routes are determined and provided to a security surveillance responder via the security surveillance responder's security surveillance terminal 130, or to a non-security person via the non-security person's non-security terminal 140.

Referring back now to display object component 212, in some embodiments a display object component 212 may define one or more display objects representing a route of travel depicting a virtual path between the location of an security surveillance terminal 130 and the location of a non-security terminal 140, location data for which having been obtained and/or stored by system resources 200, and the route determined by route component 222. A display object component 212 may also define one or more display objects representing a route of travel depicting a virtual path between the location a non-security terminal 140 and a place of safety, location data for which having been obtained and/or stored by system resources 200, and the route determined by route component 222. A display object may include any graphic (e.g., a broken or solid line, arrow, etc.) that may be displayed on an electronic display of the security surveillance terminal 130 and/or the non-security terminal 140.

Display object component 212 may dynamically refresh and/or adapt display object definitions such that the display objects displayed on display of respective units update to reflect recent information (e.g., location or orientation of respective units). For example, display object component 212 may adjust the position of display objects representing a route responsive to a determination that a portion of a real-world scene captured by a camera component 210 of an security surveillance terminal 130, non-security terminal 140, and/or non-terminal identification component 150 has changed; the changed portion capturing a different region of the real-world scene than was previously captured, such that the region of space where the non-security terminal 140 location is represented on the display changes. This is also applicable in the reverse (i.e., updating the display of a non-security terminal 140 when the real-world scene changes).

Equipment location component 224, in accordance with various embodiments of the present disclosure obtains equipment location data of one or more units of equipment in the vicinity of the emergency (the vicinity defined as desired for a given implementation). In some embodiments, such equipment location data may be obtained via location resources (e.g., location circuitry) local to or coupled with pieces of such equipment and may be provided to SSS 100 over network 120 (which in some instances may be include mesh network options). Equipment location data may be indicative of the geospatial location of one or more pieces of equipment in the vicinity of the emergency.

In accordance with one or more embodiments of the present disclosure, SSS 100 may obtain location data by actively transmitting a location data request to one or more non-terminal identification components 150 coupled with or near pieces of equipment, thereby prompting the one or more non-terminal identification components 150 (e.g., GPS modules, altimeter, barometer, beacons, RFID tags, etc.) to obtain location information and cause a data packet containing the location data (e.g., location details) to be generated and/or transmitted to a computing resource of SSS 100. For instance, SSE 110 of SSS 100 may receive a responsive transmission from the one or more pieces of equipment (i.e., from a communication interface coupled with a piece of equipment) containing the one or more pieces of equipment's respective equipment location data, and SSS 100 may propagate and/or store such information within an electronic storage or memory of SSS 100 as desired for a particular application or by a particular resource coupled to or within SSS 100.

Equipment location data may indicate geospatial location of a piece of equipment in the vicinity of the emergency, including longitude and latitude coordinates, degrees/minutes/seconds location parameters, altitude above sea level, altitude above ground level, etc. Equipment location component 224 may be utilized to identify geospatial location of a piece of equipment. The equipment location component 224 may be similar to the non-terminal identification components 150 discussed with respect to FIG. 1. Equipment location component 224 may comprise one or more circuits, modules, or chips local to the units themselves. For example, equipment location component 224 may include a GPS sensor, an altimeter, a pressure sensor (e.g., a barometer), beacon (e.g., Bluetooth beacon), RFID tag, and the like. In some embodiments, equipment location component 224 may further comprise hardware and software operating on SSE 110 and communicatively coupled with location sensors of one or more units. In various embodiments, equipment location component 224 may use equipment data 234 from storage 206 to associate details about the equipment with the position determined using the equipment location component 224. As discussed with respect to FIGS. 3A-3C, the associated equipment data 234 may be associated with a display object for the equipment to present the equipment data 234 to a security surveillance responder or non-security person through a respective terminal.

The communication component 226 may provide a two-way data communication coupling to one or more network links that are connected to one or more local networks. For example, communication component 226 may be an integrated services digital network (ISDN) card, cable modem, satellite modem, or a modem to provide a data communication connection to a corresponding type of telephone line. As another example, communication component 226 may be a local area network (LAN) card to provide a data communication connection to a compatible LAN (or WAN component to communicated with a WAN). Wireless links may also be implemented. In any such implementation, communication component 226 sends and receives electrical, electromagnetic or optical signals that carry digital data streams representing various types of information.

Communication component 226 might be used to allow software and data to be transferred between the SSS 100 and external devices. Examples of communication component 226 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communication component 226 might typically be carried on signals, which can be electronic, electromagnetic (which includes optical) or other signals capable of being exchanged by a given communication component 226. These signals might be provided to communication component 226 via a network link or channel. A network link might carry signals and might be implemented using a wired or wireless communication medium. Some examples of a network link might include a phone line, a cellular link, an RF link, an optical link, a network interface, a local or wide area network, and other wired or wireless communications channels.

A network link typically provides data communication through one or more networks to other data devices. For example, a network link may provide a connection through local network to a host computer or to data equipment operated by an Internet Service Provider (ISP). A network link may also provide a connection through local network to one or more devices, including security surveillance terminals 130, non-security terminals 140, and non-terminal identification components 150. The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication component 226, which carry the digital data to and from SSS 100, are example forms of transmission media.

The SSS 100 can send messages and receive data, including program code, through the network(s), network link and communication component 226. In the Internet example, a server might transmit a requested code for an application program through the Internet, the ISP, the local network and the communication component 226.

Security surveillance systems resources 200 may further include a virtual reality generation component 228 in various embodiments. The virtual reality generation component 228 may generate a virtual reality map of an environment that the SSS 100 is implemented in.

The environment may be a facility such as a building (e.g., corporate building, government building, hotel, museum, etc.), a campus (i.e., school, organization, institution, hospital, etc.) an open area (e.g., park, parking lot, plaza, streets, arena, etc.), a room (e.g., office, restroom, conference room, etc.), or a zone (e.g., a section of a building, a section of an open area, etc.).

To generate a virtual reality map of an environment, the SSS 100 may first obtain information of the environment. Such information of the environment may include the environment's layouts, locations of emergency infrastructure (e.g., fire hydrants, etc.), employee identification, and other information from a corporate entity, local government entity or other entities maintaining a database of such information. Such environment information may be stored in registered user data 230, structure data 232, equipment data, and/or pre-tagged data 236 in storage 206.

In some embodiments, the SSS 100 may determine the current location of each structure, person, object, event, incident, environmental change and/or emergency in the environment by obtaining information of the environment from one or more components, such as the user location component 208, camera component 210, display object component 212, equipment location component 224, of devices in the environment, including security surveillance terminals 130, non-security terminals 140 and non-terminal identification components 150. Using such components of one or more devices in the environment, SSS 100 may be able to determine the exact locations of each structure, device, person, object, event, incident, environmental change and/or emergency in the environment.

The SSS 100 may also obtain environment information that includes real-time images and other information using one or more sensor components located in the environment, including non-terminal identification components 150. Non-limiting examples of non-terminal identification components 150 may include facility devices such as cameras, sensors, computers, GPS circuitry, altimeters, barometers, beacons, gyroscope, and other similar devices. The SSS 100 may also obtain real-time images and other information of the environment using mobile devices such as smartphones, pagers, tablets, netbooks, laptop computers, smartwatches, identification tags, or any other mobile device, including security surveillance terminals 130 and non-security terminals 140. The real-time images and other information of the environment may show all of the structures, device, persons, objects, events, incidents, environmental changes and/or emergencies in the environment, in real-time, at any given moment. The real-time images and other information of the environment may also be used by the SSS 100 to determine the exact locations of each structure, person, object, event, incident, environmental change and/or emergency in the environment at any given moment.

Including additional sensor components in the non-terminal identification components 150 increases the amount of the information and real-time images collected about the environment around each non-terminal identification component 150, providing additional context of the environment. The additional sensor components in the non-terminal identification components 150 may also increase the accuracy of the information collected about the location of persons and objects in the environment. Such non-terminal identification components 150 may be associated with the environment and may be accessed by the SSS 100. In various components, non-terminal identification components 150 may transmit the information collected by the one or more sensor components to the SSS 100 via the SSE 110.

SSE 110 may then broadcast the collected information from the sensor components to each of the other terminals and/or components, such as the virtual reality generation component 228, while in some embodiments SSE 110 may store the collected information in storage 206 and distribute the collected information upon request.

The information collected from the sensor components in the environment, in combination with information of the environment stored in the structure data 232, equipment data 234, and pre-tagged data 236 of storage 206, and information of the environment collected from the user location component 208, camera component 210, display object component 212, situational status component 216 and equipment location component 224 of the SSS 100 (collectively, the "environment information"), may be used by the SSS 100 to generate a virtual reality map of the environment with the virtual reality generation component 228. SSE 110 may broadcast the structure data 232, equipment data 234, and pre-tagged data 236 of storage 206, and information of the environment collected from the user location component 208, camera component 210, display object component 212, situational status component 216 and equipment location component 224 to the virtual reality generation component 228, while in some embodiments SSE 110 may store structure data 232, equipment data 234, and pre-tagged data 236 of storage 206, and information of the environment collected from the user location component 208, camera component 210, display object component 212, situational status component 216 and equipment location component 224, and distribute one or more data and/or information collected by one or more components upon request.

Using the obtained environment information, the real-time images, and/or other environment information of the environment, either in combination or individually, the SSS 100 may generate real-time 3D visualizations of one or more portions of the environment using the virtual reality generation component 228. As a non-limiting example, a real-time 3D visualization may display the layout of the entire environment, or a particular portion of the environment (i.e., a particular building in a campus, a floor of a building, a room on a particular floor of a building, etc.) with all of the structures, persons, objects, and incidents that are present in real-time in the particular floor of the environment at a given moment in time. A real-time 3D visualization may further display all of the persons, objects, and incidents in the particular portion of the environment at their accurate locations in real-time. The SSS 100 may further use the virtual reality generation component 228 to combine the generated real-time 3D visualizations of the environment to create a virtual reality map of the environment. The virtual reality map may show all of the different portions, areas, and views of the environment to provide a complete overview of the layout, structures, persons, objects, and incidents within the environment. In this way, a person, such as security surveillance administrator or other authorized persons (hereinafter "administrator"), may view the virtual reality map to obtain a complete surveillance of the environment.

The virtual reality map may be displayed using any device capable of displaying the real-time 3D visualization images for viewing and virtual reality map may be displayed on any medium. The virtual reality map may include multiple real-time 3D visualizations with each visualization displaying different floors, sections, areas, zones, etc. of the environment. The virtual reality map may include different real-time 3D visualizations in different orientations (e.g., rotation, position, etc.) and/or view (e.g., zoom, focus, etc.). The virtual reality map may also display different objects, persons, incidents and areas in the real-time 3D visualizations with different colors, symbols, sounds, effects, labels, etc., according to the type of objects, events, environmental changes, incidents, and/or emergencies are present in the environment, and the current status of a person at a given moment in time. As an example, if a particular person were in close proximity to an incident of a fire, the SSS 100 may generate an alarm sound and a flashing red light may be displayed in the virtual reality map over the particular person in one or more real-time 3D visualizations where the particular person is shown. All of the different display options of the real-time 3D visualizations of a virtual reality map may allow an administrator to more easily view and analyze situations taking place in the environment.

An administrator may be able to interact with the virtual reality map and each of the real-time 3D visualizations. The SSS 100 may provide an administrator with administration controls to modify particular settings of the virtual reality map and each of its real-time 3D visualizations. Administration controls may include the ability to adjust the virtual reality map to display particular real-time 3D visualizations of the environment. Administration controls may include the ability to move different real-time 3D visualizations in the virtual reality map and select a particular real-time 3D visualization to view within the virtual reality map. Administration controls may include the ability to pan, zoom, and rotate the view of the virtual reality map and/or individual real-time 3D visualizations. Administration controls may include the ability to highlight any changes in the virtual reality map and/or an individual real-time 3D visualization. These administration controls may allow administrators to better facilitate the surveillance of the environment and their analysis of one or more situations occurring in the environment.

An administrator may be able to view and interact with the virtual reality map by having the virtual reality map completely surround the administrator's person. An administrator may further have administration controls to communicate with a person in the environment using the communication component 226. An administrator may further have administration controls to control one or more sensor components located in the environment, including non-terminal identification components 150, to obtain better real-time images and/or information of the environment. An administrator may further have administration controls to insert an avatar into the virtual reality map at a particular location in the environment to obtain a first-person view of the environment at that particular location.

In various embodiments, the SSS 100 may utilize, operate, and/or control one or more security surveillance system resources 200, including resources local to SSE 110, security surveillance terminals 130, non-security terminals 140, and/or non-terminal identification components 150. As a non-limiting example, the SSS 100 may operate a camera component 210 of a security surveillance terminal 130, non-security terminal 140, or non-terminal identification component 150 to capture a portion of a real-world scene within the field of view of the camera lens and CMOS array of the respective device. As discussed with respect to FIGS. 3A-3C, the associated equipment data 234 may be associated with a display object for the equipment to present the equipment data 234 to a security surveillance responder or non-security person through a respective terminal.

Figure 3A:
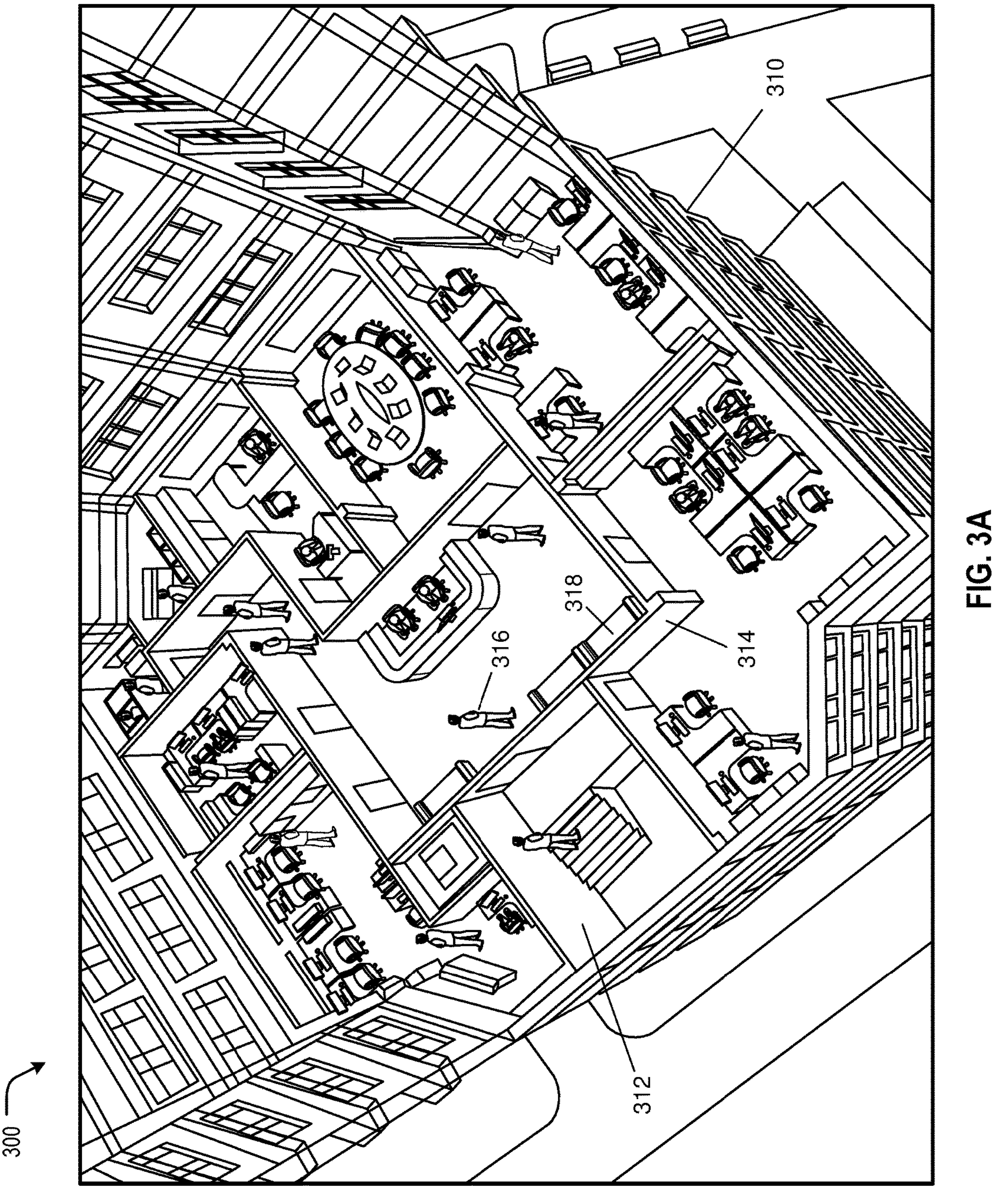
FIG. 3A illustrates an example real-time 3D visualization of a security surveillance environment according to various embodiments of the technology described in the present disclosure.

FIG. 3A illustrates an example real-time 3D visualization of an environment that the security surveillance system (SSS) 100 may generate and display. The SSS 100 may be implemented in an environment, such as facility 310. The facility 310 may be a building (e.g., corporate building, government building, hotel, museum, etc.), a campus (i.e., school, organization, institution, hospital, etc.) an open area (e.g., park, parking lot, plaza, streets, arena, etc.), a room (e.g., office, restroom, conference room, etc.), or a zone (e.g., a section of a building, a section of an open area, etc.). The SSS 100 may obtain information of the facility 310 such as the facility's 310 building layouts 312, locations of emergency infrastructure (e.g., fire hydrants, etc.), employee identification, and other information from a corporate entity, local government entity or other entities maintaining a database of such information. Such facility information may be stored in registered user data 230, structure data 232, equipment data, and/or pre-tagged data 236 in storage 206.

The SSS 100 may obtain real-time images of the entire facility 310 using facility devices such as cameras, sensors, computers, GPS circuitry, altimeters, barometers, beacons, gyroscope, and other similar devices, including the non-terminal identification components 150. The SSS 100 may also obtain real-time images of the facility 310 using mobile devices such as smartphones, pagers, tablets, netbooks, laptop computers, smartwatches, identification tags, or any other mobile device, including security surveillance terminals 130 and non-security terminals 140. The real-time images of the facility 310 may show all of the structures 314, devices, persons 316, objects 318, events, incidents, environmental changes and/or emergencies in the facility 310, in real-time, at any given moment. The real-time images and other information of the facility 310 may also be used by the SSS 100 to determine the exact locations of each structure 314, person 316, object 318, event, incident, environmental change and/or emergency in the facility 310 at any given moment.

The SSS 100 may also determine the presence of a person 316 in facility 310 by detecting one or more signals from one or more devices, such as security surveillance terminals 130 and/or non-security terminals 140, that are associated with, in use by, and/or being carried by person 316. The signals from the devices may include digital, analog, radio, thermal, electrical, voice, etc. Such devices of person 316 may include smartphones, pagers, tablets, netbooks, laptop computers, smartwatches, identification tags, or any other mobile device. One or more of the devices of person 316 may be associated with person 316 and may comprise identification information of person 316. Such identification information of person 316 may include person's 316 name, physical characteristics, home address, occupation, medical or health conditions, skillsets, etc. The SSS 100 may determine, based on the signals of the person's 316 devices and/or identification information of person 316, that person 316 is present in facility 310.

In some embodiments, the SSS 100 may further determine the current location of persons 316 and objects 318 in the facility 310 by using components, such as the user location component 208, camera component 210, display object component 212, equipment location component 224, of devices in the facility 310, including security surveillance terminals 130, non-security terminals 140 and non-terminal identification components 150. Using such components of one or more devices in the facility 310, SSS 100 may be able to determine the exact locations of the devices in facility 310.

To monitor the locations of each device in a facility 310, including mobile devices such as security surveillance terminals 130 and non-security terminals 140, and facility devices such as non-terminal identification components 150, the SSS 100 may first detect one or more signals from each of the devices. The signals from the devices may include digital, analog, radio, thermal, electrical, voice, etc. Using the detected signals from a device, the SSS 100 may locate the position of the respective device. The location of the respective device may provide a rough position of the device. To obtain a more accurate location of the device, other devices, such as other security surveillance terminals 130, non-security terminals 140, and non-terminal identification components 150, and location resources, such as cameras, sensors, computers, GPS circuitry, altimeters, barometers, beacons, gyroscope, and other facility devices present in facility 310, along with location data of equipment devices stored in a database, such as storage 206, of SSS 100 may be used. Using a collection of devices and location resources may provide accurate locations of each device in the facility 310.

Using the accurate locations of each device in the facility 310, the SSS 100 may be able to determine the exact locations of persons 316 and objects 318 in facility 310 at a given moment in time. The SSS 100 may continuously gather data from the devices in facility 310 to determine the exact location of persons 316 and objects 318 in the facility 310 at any given moment in time.

Using the obtained information of the facility 310, the real-time images of the facility 310, and/or location information of persons and objects in the facility 310, either in combination or individually, the SSS 100 may generate real-time 3D visualizations, such as virtual reality presentation 300. The virtual reality presentation 300 may display a section of the facility 310 for security surveillance administrators to view. As a non-limiting example, virtual reality presentation 300 displays a real-time 3D visualization of the layout 312 of a particular floor of facility 310 with all of the structures 314, persons 316 and objects 318 that are present in real-time on the particular floor of facility 310 at a given moment in time. The virtual reality presentation 300 further displays all of the persons 316 and objects 318 in their respective locations on the particular floor of facility 310.

The SSS 100 may generate multiple virtual reality presentations 300 with each presentation displaying different floors, sections, areas, zones, etc. of facility 310. The SSS 100 may display virtual reality presentation 300 in different orientations (e.g., rotation, position, etc.) and/or view (e.g., zoom, focus, etc.). The SSS 100 may also display different objects 318, persons 316, incidents and areas in a virtual reality presentation 300 with different colors, symbols, sounds, effects, labels, etc., according to the type of object 318, events, environmental changes, incidents, and/or emergencies are present in the facility 310, and the current status of a person 316 at a given moment in time. As an example, if a particular person 316 were in close proximity to an incident of a fire, the SSS 100 may generate an alarm sound and a flashing red light may be displayed over the particular person 316 in one or more virtual reality presentations 300 where the particular person 316 is shown. All of the different display options of a virtual reality presentation 300 may allow the administrators to more easily view and analyze situations taking place in facility 310.

The SSS 100 may further use the virtual reality generation component 228 to combine the multiple virtual reality presentations 300 of the facility 310 to create a virtual reality map of the facility 310. The virtual reality map may show all of the different portions, areas, and views of the facility 310 to provide a complete overview of the layout 312, structures 314, persons 316, objects 318, and incidents within the facility 310. In this way, an administrator may view the virtual reality map to obtain a complete surveillance of the facility 310. The virtual reality map may be displayed using any device capable of displaying the virtual reality presentations 300 for viewing and the virtual reality map may be displayed on any medium. The virtual reality map may include multiple virtual reality presentations 300.

The SSS 100 may also allow administrators to interact with the virtual reality map and each virtual reality presentation 300. The SSS 100 may provide an administrator with administration controls to modify particular settings of a virtual reality presentation 300. Administration controls may include the ability to select a virtual reality presentation 300 to view amongst a plurality of presentations. Administration controls may include the ability to pan, zoom, and rotate the view of a virtual reality presentation 300. Administration controls may include the ability to highlight any changes in a virtual reality presentation 300 that helps facilitate the administrator's analysis of one or more situations occurring in the facility 310.

An administrator may be able to view and interact with the virtual reality map by having the virtual reality map completely surround the administrator's person. The SSS 100 may further provide an administrator with administration controls to communicate with a person 316 in the facility 310 using the communication component 226. An administrator may further have administration controls to control one or more sensor components located in the facility 310, including non-terminal identification components 150, to obtain better real-time images and/or information of the facility 310. An administrator may further have administration controls to insert an avatar into the virtual reality map at a particular location in the facility 310 to obtain a first-person view of the facility 310 at that particular location.

Figure 3B:
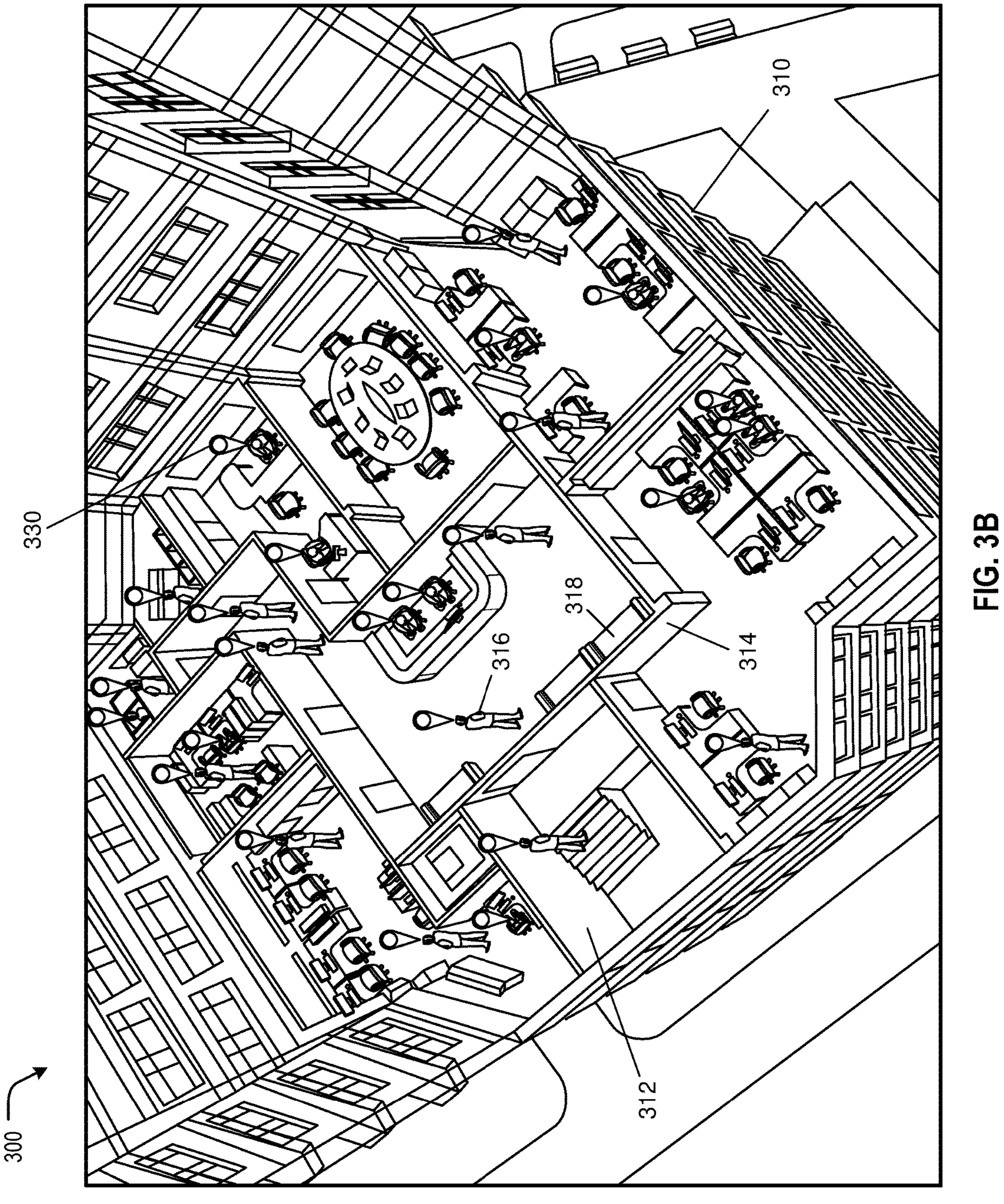
FIG. 3B illustrates another example real-time 3D visualization of the security surveillance environment according to various embodiments of the technology described in the present disclosure.

FIG. 3B illustrates example identification markers 330 displayed over each person 316 present in a virtual reality presentation 300 similar to that shown in FIG. 3A. As SSS 100 determines the presence of each person 316 in facility 310, the SSS 100 may generate an identification marker 330 for each person 316. The identification marker 330 of a particular person 316 may indicate the exact location of the particular person 316 at any given moment. In some embodiments, the identification marker 330 of the particular person 316 may indicate the location of the particular person 316 based on data received from one or more devices and location resources in facility 310. The identification marker 330 of the particular person 316 may move in one or more virtual reality presentations 300 of facility 310 as the particular person 316 moves in the facility 310.

The identification marker 330 of particular person 316 may include an identification tag that contains identification information of the particular person 316. The SSS 100 may obtain identification information of each person 316 by detecting one or more signals from one or more devices, such as security surveillance terminals 130 and/or non-security terminals 140, that are associated with, in use by, and/or being carried by each person 316, hereinafter "person's 316 devices." The signals from the devices may include digital, analog, radio, thermal, electrical, voice, etc. Such devices of persons 316 may include smartphones, pagers, tablets, netbooks, laptop computers, smartwatches, identification tags, or any other mobile device. One or more of the devices of persons 316 may be associated with a particular person 316 and may comprise identification information of the particular person 316. Such identification information of each person 316 may include that respective person's 316 name, physical characteristics, home address, occupation, medical or health conditions, skillsets, etc.

SSS 100 may further obtain identification information of each person 316 from one or more corporate entities, local government entities or other entities maintaining a database(s) of such information. SSS 100 may also obtain identification information of a person 316 from registered user data 230 in storage 206, if such identification information of a person 316 has been previously obtained and stored by SSS 100. If SSS 100 determines that identification information data of a particular person 316 associated with one or more of person's 316 devices is found in one or more databases that SSS 100 has access to, the SSS 100 may extract the stored identification information data and use the stored identification information data for the identification tag of the identification marker 330 for the respective person 316.

In some embodiments, if identification information data of a particular person 316 in facility 310 is not found, then the SSS 100 may obtain identification information data of the particular person 316 by sending a request message to one or more of person's 316 devices, requesting to obtain identification information of the particular person 316. After the request message is sent, the SSS 100 may receive a message in response to the request message. If the received message contains an authorization response to allow the SSS 100 to obtain the identification information of the particular person 316, then the SSS 100 may extract the identification information of the particular person 316 that is stored in one or more of person's 316 devices. The received response may also contain identification information of person 316 for the SSS 100 to use and store in registered user data 230 of storage 206.

In some embodiments, if the received message contains a rejection response that disapproves the request for the SSS 100 to obtain the identification information of the particular person 316, then the SSS 100 may generate a temporary identification information to be used as the identification information of the particular person 316. The extracted identification information and/or the temporary identification information may be stored in the storage 206 under registered user data 230 for future use. The extracted identification information or temporary identification information may then be used for the identification tag of the identification marker 330 of the particular person 316.

In some embodiments, the identification marker 330 for each person 316 in facility 310 may further include other identifying information of each person 316, such as each person's 316 situational status. As an example, and without any limitation, each identification marker 330 of each person 316 in facility 310 may be displayed as a particular color. The color of each identification marker 330 may represent the situational status of the respective person 316. The color green may be used to indicate a particular person 316 is safe with no apparent issues. The color yellow may be used to indicate a particular person 316 is in need of non-emergency assistance. The color red may be used to indicate a particular person 316 is in danger and/or is in need of emergency assistance. The color blue may be used to indicate a particular person 316 has only been present in the facility 310 for under one minute.

Once an identification marker 330 has been generated with an identification tag and other identifying information, the SSS 100 may continuously monitor and update the location of each identification marker 330 displayed in one or more virtual reality presentations 300 of the facility 310. Such virtual reality presentations 300 of the facility 310 may be combined to generate a virtual reality map of the facility 310. The virtual reality map and each of the virtual reality presentations 300 of the facility 310 may be interacted and viewed by administrators of the SSS 100. The identification marker 330 of a particular person 316 may be displayed throughout the virtual reality map and in each virtual reality presentation 300 that the person 316 is shown. Continuously monitoring the location of each identification marker 330 in the facility 310 allows the SSS 100 to more accurately determine the whereabouts and situational status of each person 316 in the facility 310.

Figure 3C:
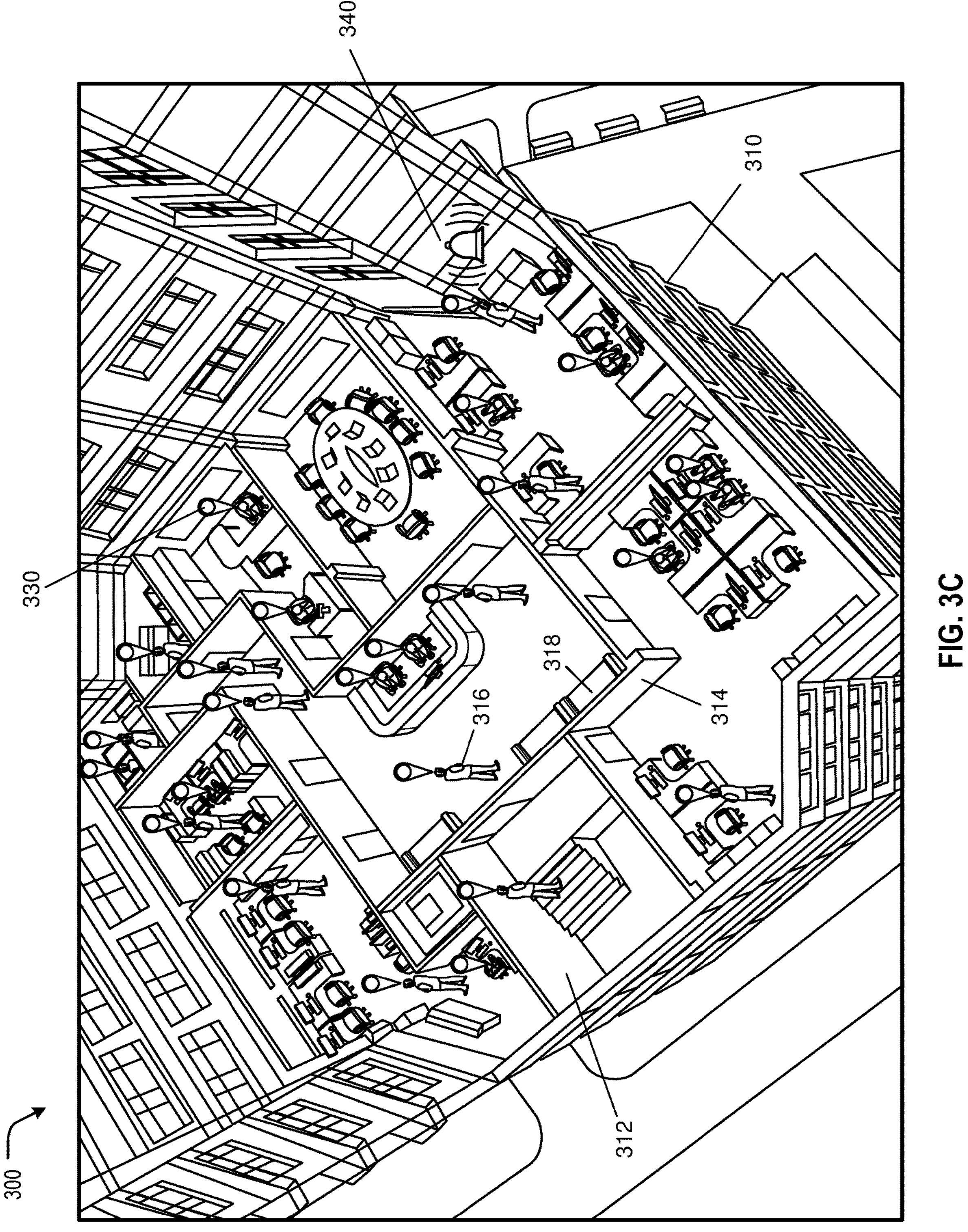
FIG. 3C illustrates another example real-time 3D visualization of the security surveillance environment according to various embodiments of the technology described in the present disclosure.

FIG. 3C illustrates an example incident symbol for an incident displayed in a virtual reality presentation 300 similar to that shown in FIG. 3B. The SSS 100 not only can detect both the presence and locations of person 316 in the facility 310, but also the presence of any incidents, events, environmental changes, and/or emergencies, hereafter referred to as "incidents 340," that occur in the facility 310. An incident 340 may include, but is not limited to, a fire, electrical blackout, water leakage, injury, sickness, use of lethal weapons, robbery, gun violence, bomb, etc. An incident 340 may also include a need to escape a dangerous situation.

When the SSS 100 determines that an incident 340 has occurred in the facility 310, the SSS 100 may determine the location of the incident 340. The SSS 100 may use components of one or more devices and location resources, including security surveillance terminals 130 and/or non-security terminals 140, and/or non-terminal identification components 150, to determine the location of the incident 340. By determining the location of the incident 340, the SSS 100 may determine which persons 316 are in close proximity to the incident 340.

The SSS 100 may further use components of one or more devices and/or location resources to determine the type of incident 340 that has occurred and analyze how dangerous the incident 340 is to persons 316 in the facility 310. The SSS 100 may also display the incident 340 in one or more virtual reality presentations 300 of the facility 310 at the location in which the incident 340 is located in the facility 310. The SSS 100 may combine the virtual reality presentations 300 of the facility 310 to generate a virtual reality map of the facility 310. The virtual reality map and each of the virtual reality presentations 300 of the facility 310 may be interacted and viewed by administrators of the SSS 100.

The incident 340 may be displayed in the virtual reality map and in each virtual reality representation 300 that the incident 340 is shown. By displaying the incident 340 at the accurate location in the virtual reality map and in one or more virtual reality presentations 300 of the facility 310, the SSS 100 may allow administrators to correctly view and analyze the situation. The SSS 100 may display an incident 340 in the virtual reality map and in one or more virtual reality presentations 300 of the facility 310 using one or more colors, symbols, sounds effects, labels, etc. As an example, if the SSS 100 detects an incident 340 of a fire in the facility 310, the SSS 100 may display a red colored fire symbol in one or more virtual reality presentations 300 of the facility 310, at the precise location of the fire incident 340 in the facility 310. The SSS 100 may further send real-time images of the incident 340 from one or more virtual reality presentations 300 of the facility 310 to one or more devices in the facility 310, including security surveillance terminals 130 and non-security terminals 140.

The SSS 100 may be able to send alerts to one or more devices, including security surveillance terminals 130 and non-security terminals 140, to mitigate and/or resolve any incidents 340, and keep all persons 316 from potential danger. In some embodiments, the devices receiving the alert messages may be all of the devices detected in the facility 310. In some embodiments, the devices receiving the alert messages may be the one or more devices of the one or more persons 316 that are in close proximity to an incident 340. In some embodiments, the devices receiving the alert messages may be the devices of the persons 316 that are directly affected by the incident 340. In some embodiments, the SSS 100 may send alerts to devices associated with person 316 who are the most qualified to resolve an incident 340. By continuously monitoring the location of each identification marker 330 and incidents 340 in the facility 310, the SSS 100 may determine when particular persons 316 may be in close proximity to any incidents 340, and correctly send alerts to devices in the facility 310.

The alert messages sent by the SSS 100 to one or more devices of persons 316 may include one or more notifications regarding the incident 340. In some embodiments, the alert messages sent by the SSS 100 to a particular device of persons 316 may include one or more notifications of the incident 340 that has occurred in the facility 310. In some embodiments, the alert messages may include one or more notifications that the person 316, associated with the particular device receiving the alert messages, is in close proximity to incident 340 in facility 310. In some embodiments, the alert messages sent may include one or more notifications that security surveillance responders are enroute to the location of the incident 340 in facility 310, or the location of the person 316 associated with the particular device. In some embodiments, the alert messages may include directions for the person 316, associated with the particular device, to follow to escape the incident 340. In some embodiments, the alert messages may include one or more notifications that the person 316 associated the particular device is in or near an unauthorized area.

The alerts may be text messages, audio messages, and/or video messages. The alerts may also include real-time images of the layout 312, structure 314, persons 316, objects 318, incidents 340, and/or devices that are in a particular area of facility 310. The SSS 100 may send alerts to one or more devices of persons 316 that have been selected for alerts to be sent to. The SSS 100 may automatically send alerts to one or more devices of persons 316 according to pre-defined settings. As an example, the SSS 100 may have pre-defined settings that a particular area of facility 310 is restricted, and SSS 100 may send alerts to any devices of persons 316 that enter into the restricted area. Authorized persons may also choose particular person 316 from one or more virtual reality presentations 300 of facility 310 to send one or more alerts to. Authorized persons may further identify particular areas from one or more virtual reality presentations 300 of the facility 310 to label and establish one or more settings to, e.g., label as restricted areas and cause the SSS 100 to automatically send alerts to any devices of persons 316 that enter into any of the restricted areas.

The SSS 100 may also determine if a particular person 316 is in need of assistance or help by detecting or receiving one or more distress signals from a device that is associated with or being used by the particular person 316. The one or more distress signals may include notifications that the particular person 316 is in need of assistance or help. The one or more distress signals may also include information regarding the type of help being requested, the condition of the particular person 316, and the location of the particular person 316. The one or more distress signals may further include identification information of particular person 316.

If the SSS 100 has determined that the person 316 is in need of assistance, the SSS 100 may send one or more incident alerts to one or more devices of security surveillance responders, including security surveillance terminals 130. The SSS 100 may also send one or more incident alerts to one or more devices of other persons 316 in the facility 310 who are not security surveillance responders, e.g., non-security terminals 140. The security surveillance responders and/or other persons 316 who receive one or more incident alerts from the SSS 100 may be in close proximity to the particular person 316 in need of assistance.

The incident alerts may include information regarding the particular person 316 in need of assistance, including the particular person's name, current situation of the particular person 316, and environmental situation of the person. The incident alerts may also include the location of the particular person 316 and directions to the location of the particular person 316 based on the current location of the device that is receiving the incident alerts. The incident alerts may also include the location of the incident 340, the type of incident 340, and any additional information relating to the incident 340. The incident alerts may be messages that include text, audio and/or video relaying any of the above information.

In addition to the SSS 100 sending out one or more alert messages regarding one or more incidents 340 to one or more devices in facility 310, the SSS 100 may also receive one or more resolution alerts when the one or more incidents 340 have been resolved. The SSS 100 may receive one or more resolution alerts from one or more devices of persons 316 in facility 310, including security surveillance responders (e.g., security surveillance terminals 130) and/or individuals who are not security surveillance responders (e.g., non-security terminals 140). The SSS 100 may also receive one or more resolution alerts from one or more other devices and location resources, including non-terminal identification components 150. The one or more resolution alerts may include messages including audio, text and/or video stating and/or showing that the one or more incidents 340 have been resolved. Using the one or more received resolution alerts along with one or more components of devices in facility 310, the SSS 100 may determine if each incident 340 in the facility 310 has been resolved. The SSS 100 may further send more alert messages to one or more devices in facility 310 if the security surveillance system determines that one or more incidents 340 have yet to be resolved.

After the SSS 100 has received one or more resolution alerts and/or determined that one or more incidents 340 in facility 310 have been resolved, the SSS 100 may update the virtual reality presentations 300 of the facility 310. As an example, if the SSS 100 has received one or more resolution alerts stating that a fire incident 340 has been extinguished, and SSS 100 has determined that the fire incident 340 has been resolved, the SSS 100 may update the virtual reality presentations 300 of the facility 310 by removing the fire incident 340 indicator displayed in the virtual reality presentations 300. Regardless of whether an incident 340 has been resolved, the SSS 100 may continuously update the virtual reality presentations 300 of the facility 310 to accurately display the locations of persons 316 and incidents 340 in the facility 310 at any given moment in time.

Figure 4:
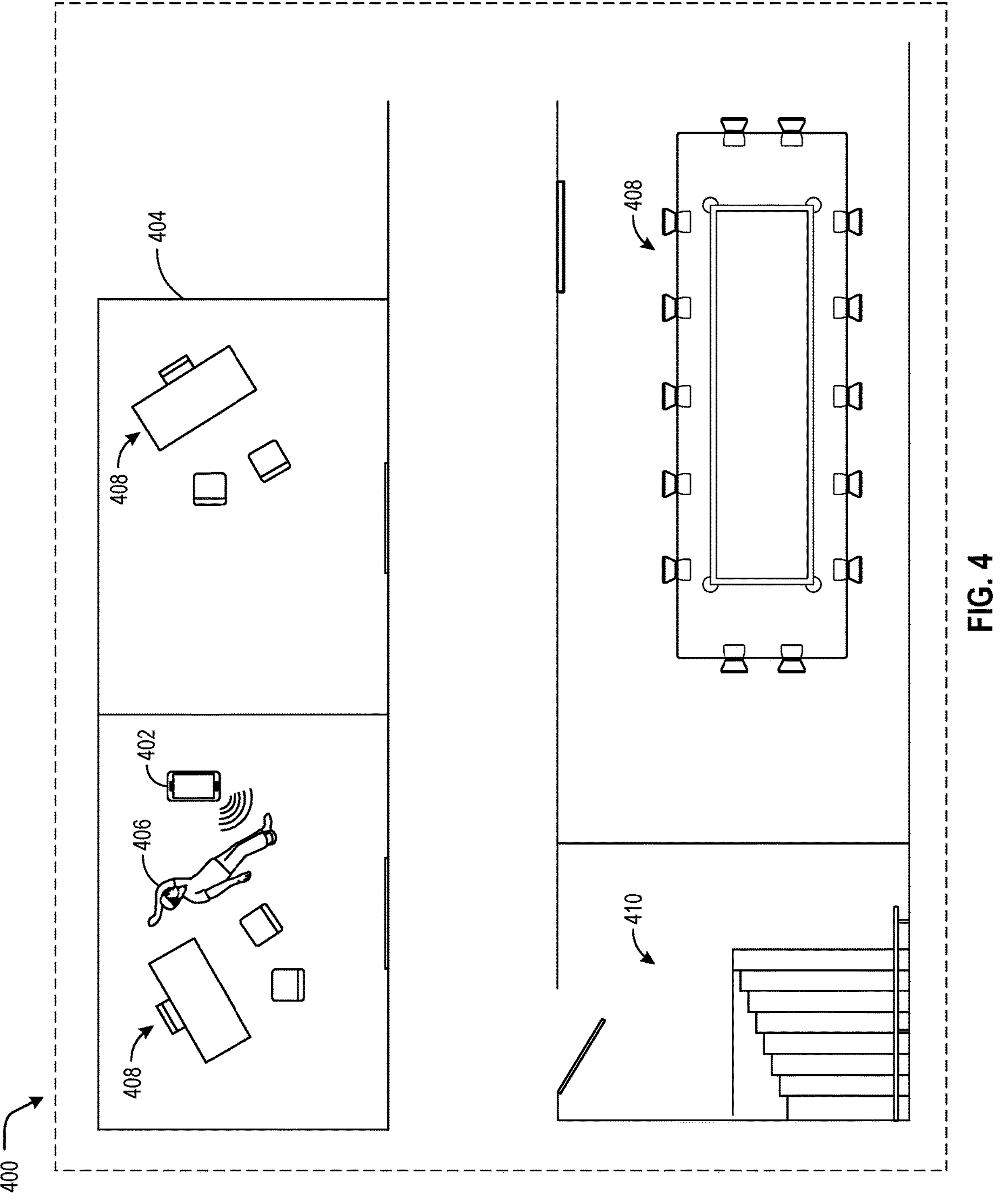
FIG. 4 illustrates another example real-time 3D visualization of the security surveillance environment according to various embodiments of the embodiments of the technology described in the present disclosure.

FIG. 4 illustrates another example real-time 3D visualization of a particular section of a facility 310 that the security surveillance system 100 may generate and display. The SSS 100 may generate one or more real-time 3D visualizations, such as virtual reality presentation 400 and virtual reality presentation 300. Virtual reality presentation 400 may display a particular area, section, zone, room, etc. of the facility 310. The SSS 100 may generate the virtual reality presentation 400 using facility information and/or real-time images of the facility 310. Facility information may include the layouts, locations of emergency infrastructure (e.g., fire hydrants, etc.), and other information of facility 310 from a corporate entity, local government entity or other entities maintaining a database of such information. Such facility information may be stored in registered user data 230, structure data 232, equipment data, and/or pre-tagged data 236 in storage 206. The real-time images of the facility 310 may be obtained using cameras, sensors, and other similar devices, including the security surveillance terminals 130, non-security terminals 140 and non-terminal identification components 150. The real-time images of the facility 310 may show the devices 402, structures 404 (e.g., structures 314 shown in FIGS. 3A-3C), person 406 (e.g., persons 316 shown in FIGS. 3A-3C), objects 408 (e.g., objects 318 shown in FIGS. 3A-3C), incidents (e.g., incidents 340 shown in FIGS. 3A-3C), and layout (e.g., layout 312 shown in FIGS. 3A-3C) in a particular area, section, zone, or room of the facility 310.

SSS 100 may generate virtual reality presentation 400 to provide a better image of the layout, structures 404, person 406, objects 408, incidents and devices 402 present in a particular area of the facility 310. As shown in FIG. 4, the virtual reality presentation 400 shows that person 406 is laying on the ground and is in need of assistance. The virtual reality presentation 400 also shows that device 402 is in close proximity to person 406. The SSS 100 may use one or more components of device 402 along with one or more components of other devices, including security surveillance terminals 130, non-security terminals 140, and non-terminal identification components 150 to determine the exact location of the person 406.

Once the location of the person 406 has been determined, the SSS 100 may send one or more alerts to one or more devices. The devices that receive the alerts may be one or more security surveillance terminals 130 of security surveillance responders. The devices that receive the alerts may be one or more non-security terminals 140 of other persons 406 in the facility 310. The alerts may include the identification information, condition, and requested assistance of person 406. The alerts may also include directions to reach the location of person 406 according to the location of the respective device receiving the alerts. The alerts may be text messages, audio messages, and/or video messages. The alerts may also include real-time images of the layout, structure 404, person 406, objects 408, incidents, and/or devices 402 that are in close proximity of person 406.

As an example, if person 406 is unconscious and unresponsive to messages and alerts being sent to device 402, the SSS 100 may send alerts and messages to the nearest security surveillance responder via a security surveillance terminal 130. The nearest security surveillance responder may be located on the floor directly below the floor that person 406 is located in facility 310. The alerts to the nearest security surveillance responder may include instructions to take the stairs 410 to reach the location of person 406 as the path of using stairs 410 would be the fastest route to person 406. The instructions may include a real-time image of the virtual reality representation 400 showing the layout, device 402, structure 404, person 406, objects 408 and stairs 410.

The SSS 100 may continue to generate and update the virtual reality representation 400 to monitor the condition of person 406 and ensure that person 406 is attended to. The SSS 100 may stop generating virtual reality representation 400 when person 406 has been attended to and is not in any danger. The SSS 100 may determine that person 406 is no longer in any danger by receiving one or more resolution alerts from person 406 and/or other persons, such as a security surveillance responder.

The SSS 100 may combine multiple real-time 3D visualizations, such as virtual reality representation 300 and virtual reality representation 400, to generate a virtual reality map of the facility 310 using the virtual reality generation component 228. The virtual reality map may be displayed using any device capable of displaying the real-time 3D visualization images for viewing and virtual reality map may be displayed on any medium. The virtual reality map may include multiple real-time 3D visualizations with each presentation displaying different floors, sections, areas, zones, etc. of the facility 310, such as virtual reality representation 300 and virtual reality representation 400. The virtual reality map may include different real-time 3D visualizations in different orientations (e.g., rotation, position, etc.) and/or view (e.g., zoom, focus, etc.). The virtual reality map may also display different objects, persons, incidents and areas in the real-time 3D visualizations with different colors, symbols, sounds, effects, labels, etc., according to the type of objects, events, environmental changes, incidents, and/or emergencies are present in the facility 310, and the current status of a person at a given moment in time. As an example, virtual reality representation 400 shows a particular person 406 who is in need of help. The SSS 100 may generate an alarm sound and a flashing red light may be displayed in the virtual reality representation 400 over the particular person 406 and in all other real-time 3D visualizations in the virtual reality map where the particular person 406 is shown. All of the different display options of the real-time 3D visualizations, such as virtual reality representation 300 and virtual reality representation 400 of a virtual reality map may allow an administrator to more easily view and analyze situations taking place in the facility 310.

Figure 5:
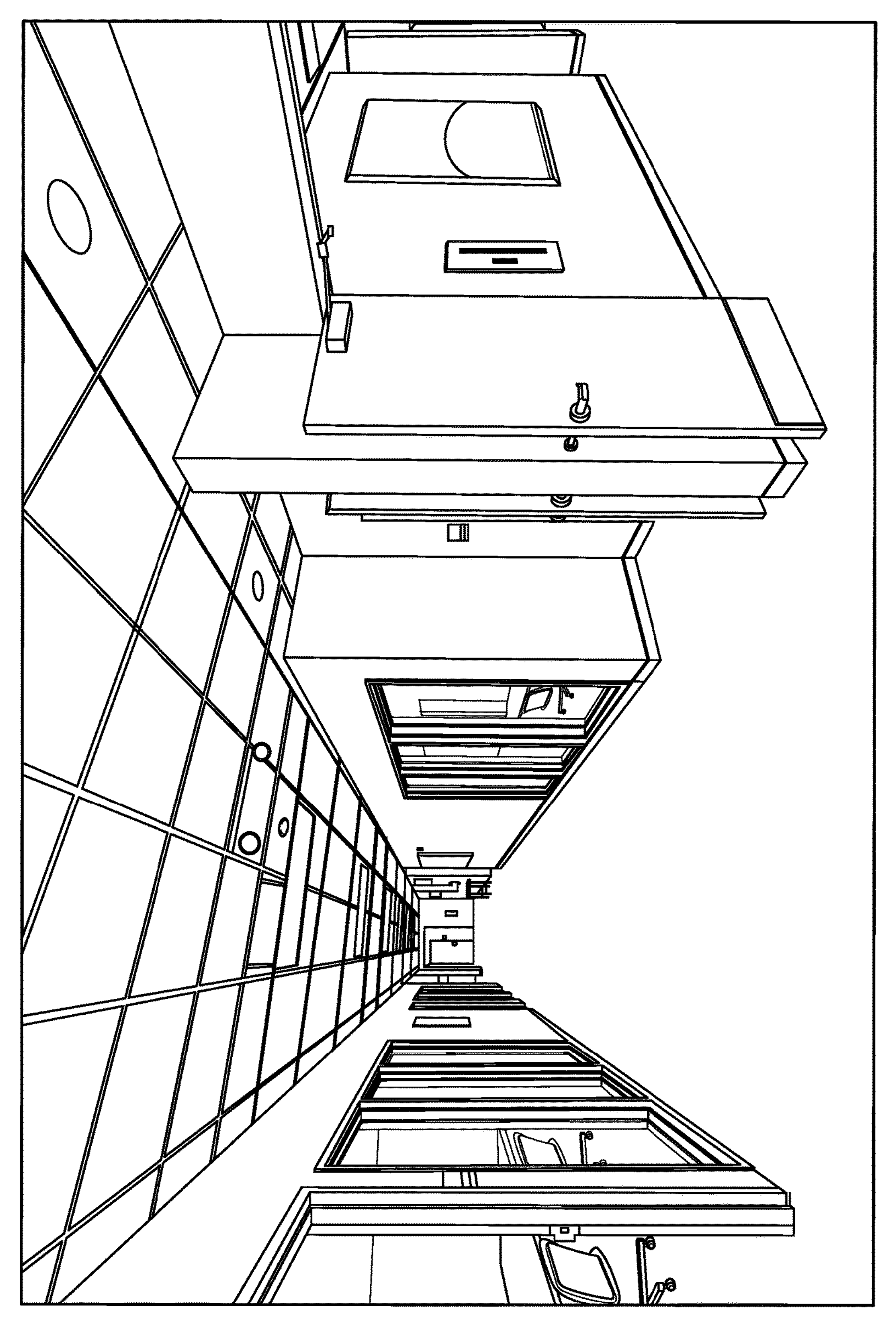
FIG. 5 illustrates another example real-time 3D visualization of the security surveillance environment according to various embodiments of the technology described in the present disclosure.

FIG. 5 illustrates another example real-time 3D visualization in a particular point of view that the security surveillance system 100 may generate and display. The SSS 100 may generate one or more real-time 3D visualizations, such as virtual reality presentation 500, virtual reality presentation 400 and virtual reality presentation 300. Virtual reality presentation 500 may display a particular area, section, zone, room, etc. of the facility 310 in the point of view of a person, such as person 316 or person 406, placed in a particular location in facility 310. The virtual reality presentation 500, virtual reality presentation 400 and virtual reality presentation 300 may be combined, along with other real-time 3D visualizations of the facility 310, to generate a virtual reality map of the facility 310.

In some embodiments, the virtual reality presentation 500 may be generated by SSS 100 using the virtual reality generation component 228 at the request of an administrator. The SSS 100 may provide an administrator with administration controls to modify particular settings of the virtual reality map and each of its real-time 3D visualizations, such as virtual reality representation 300, virtual reality representation 400, and virtual reality representation 500. Administration controls may include the ability to adjust the virtual reality map to display particular real-time 3D visualizations of the facility 310. Administration controls may include the ability to move different real-time 3D visualizations in the virtual reality map and select a particular real-time 3D visualization to view within the virtual reality map. Administration controls may include the ability to pan, zoom, and rotate the view of the virtual reality map and/or individual real-time 3D visualizations. Administration controls may include the ability to highlight any changes in the virtual reality map and/or an individual real-time 3D visualization. These administration controls may allow administrators to better facilitate the surveillance of the facility 310 and their analysis of one or more situations occurring in the facility 310.

An administrator may be able to view and interact with the virtual reality map by having the virtual reality map completely surround the administrator's person. An administrator may further have administration controls to communicate with a person in the facility 310 using the communication component 226. An administrator may further have administration controls to control one or more sensor components located in the facility 310, including non-terminal identification components 150, to obtain better real-time images and/or information of the facility 310. An administrator may further have administration controls to insert an avatar into the virtual reality map at a particular location in the facility 310 to obtain a first-person view of the facility 310 at that particular location, such as virtual reality presentation 500.

The SSS 100 may generate the virtual reality presentation 500 using facility information and/or real-time images of the facility 310. Facility information may include the layouts, locations of emergency infrastructure (e.g., fire hydrants, etc.), and other information of facility 310 from a corporate entity, local government entity or other entities maintaining a database of such information. Such facility information may be stored in registered user data 230, structure data 232, equipment data, and/or pre-tagged data 236 in storage 206. The real-time images of the facility 310 may be obtained using cameras, sensors, and other similar devices, including the security surveillance terminals 130, non-security terminals 140 and non-terminal identification components 150. The real-time images of the facility 310 may show the devices (e.g., devices 402 shown in FIG. 4), structures (e.g., structures 404 shown in FIG. 4 or structures 314 shown in FIGS. 3A-3C), person (e.g., persons 406 shown in FIG. 4 or persons 316 shown in FIGS. 3A-3C), objects (e.g., objects 408 shown in FIG. 4 or objects 318 shown in FIGS. 3A-3C), incidents (e.g., incidents 340 shown in FIGS. 3A-3C), and layout (e.g., layout 312 shown in FIGS. 3A-3C) in a particular area, section, zone, or room of the facility 310 in the point of view of a person.

By generating the virtual reality presentation 500 showing an area of the facility 310 in the point of view of a person in a particular location of the facility 310, the SSS 100 may allow an administrator viewing the virtual reality presentation 500 to better assess the surroundings of a person in that particular location of the facility 310. The administrator may then provide adequate instructions to a person in that particular location of the facility 310. In some embodiments, instructions may include directions for the person to take to reach a particular destination in the facility 310.

The SSS 100 may also send one or more messages to a particular device, such as device 402, and request the person, e.g., person 316 or person 406, associated with or using the particular device to establish a video connection with an administrator. The one or more messages to the particular device my include instructions to enable the camera of the particular device and have the person, associated with or using the particular device, to aim the camera of the particular device towards the person's point of view. When a video connection between the administrator and the particular device is established, the administrator may then view the facility as captured by the camera of the particular device. By viewing the facility from the perspective of the camera of the particular device, the administrator may obtain a real-time 3D visualization of what the person is seeing, such as virtual reality representation 500.

The SSS 100 may further send images of the virtual reality presentation 500 to one or more devices, including security surveillance terminals 130 and non-security terminals 140. The persons using the devices that receive the images of the virtual reality presentation 500 may use the images, along with other images, instructions, and messages from the SSS 100, to perform one or more tasks. In some embodiments, a task may be to find a particular person in the facility 310. In some embodiments, a task may be to escape a particular area of the facility 310. The images of the virtual reality presentation 500 may also include symbols, colors, effects, etc., to notify persons viewing the images of persons, objects, incidents, etc., that the SSS 100 has detected in the locations of the facility 310 depicted in the images. As an example, images of the virtual reality presentation 500 may include an arrow on the floor to show the direction in which a person should go to reach a particular destination in the facility 310.

FIG. 6 illustrates a computing component 600 that includes one or more hardware processors 602 and machine-readable storage media 604 storing a set of machine-readable/machine-executable instructions that, when executed, cause the hardware processor(s) 602 to perform an illustrative method of virtual reality security surveillance. It should be appreciated that there can be additional, fewer, or alternative steps performed in similar or alternative orders, or in parallel, within the scope of the various examples discussed herein unless otherwise stated. FIG. 6 summarizes and further elaborates on some aspects previously described.

At step 606, the hardware processor(s) 602 may execute machine-readable/machine-executable instructions stored in the machine-readable storage media 604 to receive data from a facility device in a facility. A security surveillance system (e.g., security surveillance system 100 shown in FIG. 1) may be implemented in a particular facility. The facility may include a building (e.g., corporate building, government building, hotel, museum, etc.), a campus (i.e., school, organization, institution, hospital, etc.) an open area (e.g., park, parking lot, plaza, streets, arena, etc.), a room (e.g., office, restroom, conference room, etc.), or a zone (e.g., a section of a building, a section of an open area, etc.).

The security surveillance system may detect one or more signals from one or more facility devices in the facility to determine and monitor the locations of the facility devices. The signals from the facility devices may include digital, analog, radio, thermal, electrical, voice, etc. Using the detected signals from a facility device, the security surveillance system may locate the position of the facility device. The location of the facility device determined by the signals received from the facility device may provide a rough position of the facility device. To obtain a more accurate location of the facility device, other devices, such as mobile devices, and location resources may be used such as cameras, sensors, computers, GPS circuitry, altimeters, barometers, beacons, gyroscope, and location data of equipment devices either located in the facility and/or stored in a database (e.g., storage 206 shown in FIG. 2) of the security surveillance system. Using a collection of facility devices, mobile devices, and location resources may provide accurate locations of each facility device in the facility.

The security surveillance system may receive data that is obtained by at least one facility device (e.g., non-terminal identification components 150 shown in FIG. 1) located in the facility. Such data may include information of the facility such as the facility's layouts, locations of emergency infrastructure (e.g., fire hydrants, etc.), employee identification, and other information from a corporate entity, local government entity or other entities maintaining a database of such information. Such facility information may also include the locations of each facility device in the facility. Such facility information may be stored in a storage database.

The facility information may also include real-time images and other facility information obtained by at least one facility device located in the facility. Facility devices may include cameras, sensors, computers, GPS circuitry, altimeters, barometers, beacons, gyroscope, and other similar devices. The security surveillance system may also obtain real-time images and other information of the facility using mobile devices such as smartphones, pagers, tablets, netbooks, laptop computers, smartwatches, identification tags, or any other mobile device, (e.g., security surveillance terminals 130 and non-security terminals 140 shown in FIG. 1). The real-time images and other facility information of the facility may show all of the structures, device, persons, objects, events, incidents, environmental changes and/or emergencies in the facility, in real-time, at a given moment. The real-time images and other facility information of the facility may also be used by the security surveillance system to determine the exact locations of each structure, person, object, event, incident, environmental change and/or emergency in the facility at any given moment.

At step 608, the hardware processor(s) 602 may execute machine-readable/machine-executable instructions stored in the machine-readable storage media 604 to generate a virtual reality map of the facility based on the received data. The data received by the security surveillance system from the facility devices of the facility may be used to generate one or more real-time 3D visualizations of the facility. A real-time 3D visualization may display the layout of the entire facility, a particular portion of the facility, such as a particular floor of a building (i.e., virtual reality representation 300 as shown in FIGS. 3A-3C), or a particular area of a facility (i.e., virtual reality representation 400 as shown in FIG. 4), with all of the devices, structures, persons, objects, and incidents that are present in real-time in the facility at a given moment in time. A real-time 3D visualization may further display all of the devices, persons, objects, and incidents in the particular portion of the facility at their accurate locations in real-time.

The security surveillance system may combine the real-time 3D visualizations of the facility to generate a virtual reality map of the facility. The virtual reality map may display the complete layout with all of the structures, persons, objects, incidents, etc. that are present in the entire facility. The virtual reality map may include multiple real-time 3D visualizations with each visualization displaying different floors, sections, areas, zones, etc. of the facility. The virtual reality map may include different real-time 3D visualizations in different orientations (e.g., rotation, position, etc.) and/or view (e.g., zoom, focus, etc.). The virtual reality map may also display different objects, persons, incidents and areas in the real-time 3D visualizations with different colors, symbols, sounds, effects, labels, etc., according to the type of objects, events, environmental changes, incidents, and/or emergencies present in the facility, and the current status of a person at a given moment in time. All of the different display options of the real-time 3D visualizations of a virtual reality map may allow the security surveillance system to more easily view and analyze situations taking place in the facility.

The security surveillance system may display the virtual reality map using any device capable of displaying the real-time 3D visualization images for viewing and the virtual reality map may be displayed on any medium.

At step 610, the hardware processor(s) 602 may execute machine-readable/machine-executable instructions stored in the machine-readable storage media 604 to display a first three-dimensional (3D) view of the facility. The security surveillance system may display a particular real-time 3D visualization from the virtual reality map as a first 3D view of the facility for viewing. The first 3D view of the facility may be viewed by one or more security surveillance administrators or other authorized persons to view.

The first 3D view of the facility may display the layout of the entire facility, a particular portion of the facility, such as a particular floor of a building (i.e., virtual reality representation 300 as shown in FIGS. 3A-3C), or a particular area of a facility (i.e., virtual reality representation 400 as shown in FIG. 4), with all of the structures, persons, objects, and incidents that are present in real-time in the particular location of the facility being displayed, at a given moment in time. The first 3D view may further display all of the persons, objects, and incidents in the particular portion of the facility at their accurate locations in real-time. The first 3D view may be displayed using any device capable of showing images for viewing.

At step 612, the hardware processor(s) 602 may execute machine-readable/machine-executable instructions stored in the machine-readable storage media 604 to determine locations of mobile devices in the facility. The security surveillance system may monitor locations of mobile devices in a facility. Mobile devices in a facility may include smartphones, pagers, tablets, netbooks, laptop computers, smartwatches, identification tags, or any other mobile device. Each mobile device in the facility may be associated with a different person or entity. The mobile devices in a facility may be associated with security surveillance personnel (e.g., security surveillance terminals 130 shown in FIG. 1), or non-security persons (e.g., non-security terminals 140 shown in FIG. 1). Each mobile device may comprise identification information of the person the device is associated with. Such identification information may include a person's name, physical characteristics, home address, occupation, medical or health conditions, skillsets, etc.

To monitor the locations of each mobile device in a facility, the security surveillance system may first detect one or more signals from each of the mobile devices. The signals from the mobile devices may include digital, analog, radio, thermal, electrical, voice, etc. Using the detected signals from a mobile device, the security surveillance system may locate the position of the mobile device. The location of the mobile device determined by the signals received from the mobile device may provide a rough position of the mobile device. To obtain a more accurate location of the mobile device, other devices, such as facility devices, and location resources may be used such as cameras, sensors, computers, GPS circuitry, altimeters, barometers, beacons, gyroscope, and location data of equipment devices either located in the facility and/or stored in a database (e.g., storage 206 shown in FIG. 2) of the security surveillance system. Using a collection of mobile devices, facility devices, and location resources may provide accurate locations of each mobile device in the facility.

Once the location of a mobile device has been accurately determined, the security surveillance system may insert, on the real-time 3D visualizations of the facility, an identification marker at the location of each detected mobile device. The identification marker of a particular mobile device may indicate the exact location of the particular mobile device at any given moment. The identification marker of the particular mobile device may move on the real-time 3D visualizations of the facility as the particular mobile device moves in the facility. The identification marker of the particular mobile device may be used as an indicator of the location of the particular person carrying the particular mobile device. The identification markers may be displayed in the virtual reality map on each real-time 3D visualization that a detected mobile device has been determined.

Each identification marker displayed on the real-time 3D visualizations of the facility may be labeled with an identification tag associated with the person carrying the respective mobile device. The identification tag may include identification information of the person carrying the respective mobile device. Such identification information may include a person's name, physical characteristics, home address, occupation, medical or health conditions, skillsets, etc.

The security surveillance system may obtain the identification information of a person carrying a detected mobile device in the facility from a database (e.g., storage 206 shown in FIG. 2). The database may contain identification information data of persons who are associated with the facility and/or the security surveillance system (e.g., registered user data 230 shown in FIG. 2). If identification information data of a particular person associated with a particular detected mobile device is found in the database, the security surveillance system may extract the stored identification information data and use the stored identification information data for the identification tag of the identification marker for the respective mobile device.

In some embodiments, if identification information data of the particular person associated with the particular detected mobile device is not found, then the security surveillance system may obtain identification information data of the particular person by sending a request message to the particular detected mobile device requesting identification information of the particular person. After the request message is sent, the security surveillance system may receive a message in response to the request message. If the received message contains an authorization response to allow the security surveillance system to obtain the identification information of the particular person, then the security surveillance system may extract the identification information of the particular person that is stored in the particular detected mobile device. The received response may also contain identification information of the particular person for the security surveillance system to use and store in one or more databases.

In other embodiments, if the received message contains a rejection response that disapproves the request for the security surveillance system to obtain the identification information of the particular person, then the security surveillance system may generate a temporary identification information to be used as the identification information of the particular person. The extracted identification information and/or the temporary identification information may be stored in the database for future use. The extracted identification information or temporary identification information may then be used for the identification tag of the particular identification marker of the particular detected mobile device.

Once an identification marker has been generated with an identification tag containing the identification information of the respective person associated with the respective detected mobile device, the security surveillance system may continuously monitor the location of the respective detected mobile device and continuously reposition the identification marker displayed in one or more real-time 3D visualizations of the facility. The identification marker for each detected mobile device may be displayed on one or more real-time 3D visualizations of the facility. Such real-time 3D visualizations of the facility may be viewed by security surveillance system administrators. By continuously monitoring the location of each detected mobile device in the facility, and continuously updating the locations of each identification marker, the security surveillance system may more accurately determine the whereabouts of the persons using or associated with the detected mobile devices in the facility.

At step 614, the hardware processor(s) 602 may execute machine-readable/machine-executable instructions stored in the machine-readable storage media 604 to detect a first incident occurred in the facility. The security surveillance system may not only detect the presence and locations of one or more mobile devices in the facility, but also the presence of any incidents, events, environment changes, and/or emergencies, hereafter referred to as "incidents," that occur in the facility. An incident may include, but is not limited to, a fire, electrical blackout, water leakage, injury, sickness, use of lethal weapons, robbery, gun violence, bomb, etc. An incident may also include a need to escape a dangerous situation.

When the security surveillance system determines that an incident has occurred, the security surveillance system may determine the location of the incident. The security surveillance system may use components of one or more detected mobile devices (e.g., security surveillance terminals 130 and/or non-security terminals 140 shown in FIG. 1), and/or one or more other devices, such as facility devices, and location resources (e.g., non-terminal identification components 150 shown in FIG. 1), to determine the location of the incident. By determining the location of the incident, the security surveillance system may determine which detected mobile devices are in close proximity of the incident.

The security surveillance system may further use components of one or more detected mobile devices and/or one or more facility devices and location resources to determine a type to the incident that has occurred and analyze how dangerous the incident is to persons in the facility. The security surveillance system may also display the incident in the one or more real-time 3D visualizations of the virtual reality map of the facility, at the location in which the incident is located in the facility. By displaying the incident at the accurate location in the one or more real-time 3D visualizations of the virtual reality map of the facility, the security surveillance system may adequately analyze the situation. The security surveillance system may display an incident in one or more real-time 3D visualizations of the virtual reality map of the facility using one or more colors, symbols, sounds, effects, labels, etc. As an example, if the security surveillance system detects a fire in the facility, the security surveillance system may display a red fire symbol in the real-time 3D visualizations of the virtual reality map of the facility, at the precise location of the fire in the facility. The security surveillance system may further send real-time images of the incident from the real-time 3D visualizations of the virtual reality map of the facility to one or more detected devices in the facility. The security surveillance system may further allow administrators to view and interact with the virtual reality map and each of the real-time 3D visualizations.

At step 616, the hardware processor(s) 602 may execute machine-readable/machine-executable instructions stored in the machine-readable storage media 604 to send an alert message to a first mobile device of the mobile devices. The security surveillance system may continuously monitor the facility and display all of the identification markers for each detected mobile device in the facility at each of the detected mobile device's location on the real-time 3D visualizations of the virtual reality map. In this way, the security surveillance system may know the locations of each detected mobile device in the facility. The security surveillance system may also display any events, environment changes, incidents and/or emergencies that occur in the facility on the real-time 3D visualizations of the virtual reality map.

By monitoring all of the locations of detected mobile devices using identification markers and any incidents, environment changes, events, and/or emergencies that occur in the facility, the security surveillance system may determine when particular detected mobile devices may be in close proximity to any incidents, environment changes, events, and/or emergencies. When an environment change, incident and/or emergency is detected by the security surveillance system, the security surveillance system may send an alert message to a mobile device in the facility. The mobile device receiving the alert message may be a mobile device detected in the facility. The mobile device receiving the alert message may be a mobile device that is in close proximity to a detected environment change, incident and/or emergency occurring in the facility. The mobile device receiving the alert message may be a mobile device that is directly affected by the detected environment changes, incidents and/or emergencies occurring in the facility.

The alert message sent by the security surveillance system to a particular mobile device may include a notification of an environment change, incident and/or emergency that has occurred or is occurring in the facility. The alert message sent by the security surveillance system to a particular mobile device may include a notification that the particular mobile device is in close proximity to an environment change, incident and/or emergency that has occurred or is occurring in the facility. The alert message sent by the security surveillance system to a particular mobile device may include a notification that a security surveillance responder is enroute to the location of the environment change, incident and/or emergency that has occurred or is occurring in the facility, or the location of the particular mobile device receiving the alert message. The alert message sent by the security surveillance system to a particular mobile device may include directions for the person associated or using the particular mobile device to follow to escape an environment change, incident and/or emergency that has occurred or is occurring in the facility. The alert message sent by the security surveillance system to a particular mobile device may include a notification that the person associated or in possession of the particular mobile device is in or near an unauthorized area. Many variations are possible.

At step 618, the hardware processor(s) 602 may execute machine-readable/machine-executable instructions stored in the machine-readable storage media 604 to display a second 3D view of a surrounding area of the first mobile device. After the security surveillance system has sent an alert message to a mobile device, the security surveillance system may display a real-time 3D visualization of the area where the mobile device is currently located in the facility. The real-time 3D visualization of the area where the mobile device is located may be the second 3D view being displayed by the security surveillance system. The second 3D view may display real-time images showing the layout of the area where the mobile device is located, the exact location of mobile device, and any and all persons and objects currently located in the respective area of the facility.

Using the second 3D view showing the real-time 3D visualization of the area where the mobile device is located in the facility, the security surveillance system may determine the current location and/or situation of a person using or associated with the mobile device in the respective area. The security surveillance system may use components of the detected mobile device (e.g., security surveillance terminals 130 and/or non-security terminals 140 shown in FIG. 1), or other facility devices and location resources (e.g., non-terminal identification components 150 shown in FIG. 1) to accurately locate one or more persons and assess the area. Accurately locating one or more persons may allow the security surveillance system to determine the distance between the persons and one or more detected mobile devices. Assessing the area may allow the security surveillance system to determine the current situations of each person and the environmental situations around each person. Current situations of a person may include the health and physical state of the person. The environmental situation around a person may include the type of area the person is located in (e.g., office, bathroom, stairs, etc.), the objects surrounding the person, and any environmental changes, incidents, and/or emergencies in the area of the person.

After using the second 3D view of the real-time 3D visualizations of the area to accurately locate a person in the respective area and assess the current situation of the person and the environmental situation around the person, the security surveillance system may determine if the person is in need of assistance or help. The security surveillance system may also determine if a person is in need of assistance or help by detecting or receiving a distress signal from a detected mobile device that is associated with or being used by the person. The distress signal may include a notification that the person is in need of assistance or help. The distress signal may also include information regarding the type of help being requested, the condition of the person, and the location of the person.

If the security surveillance system has determined that the person is in need of assistance, the security surveillance system may send an incident alert to the mobile device of a security surveillance responder (e.g., security surveillance terminals 130 shown in FIG. 1). The security surveillance system may also send an incident alert to a mobile device of another person in the facility who is not a security surveillance responder (e.g., non-security terminals 140 shown in FIG. 1). The security surveillance responder and/or other person who receives an incident alert from the security surveillance system may be in close proximity to the person in need of assistance.

The incident alert may include information regarding the person in need of assistance, including the person's name, current situation of the person, and environmental situation of the person. The incident alert may also include the location of the person and directions to the location of the person based on the current location of the mobile device that is receiving the incident alert. The incident alert may also include the location of the incident, the type of incident, and any additional information relating to the incident. The incident alert may be a message that includes text, audio and/or video relaying any of the above information.

At step 620, the hardware processor(s) 602 may execute machine-readable/machine-executable instructions stored in the machine-readable storage media 604 to receive a resolution alert. In addition to the security surveillance system sending out an alert message regarding an incident in the facility to a mobile device detected in the facility, the security surveillance system may also receive a resolution alert when an incident has been resolved. The security surveillance system may receive a resolution alert from a mobile device of a security surveillance responder (e.g., security surveillance terminals 130 shown in FIG. 1) and/or a mobile device of another person who is not a security surveillance responder (e.g., non-security terminals 140 shown in FIG. 1). The security surveillance system may also receive a resolution alert from a facility device and other location resources (e.g., non-terminal identification components 150 shown in FIG. 1). The resolution alert may include a message including audio, text and/or video stating and/or showing that an incident has been resolved. Using a received resolution alert along with one or more components of facility devices in the facility, the security surveillance system may determine if an incident in the facility has been resolved. The security surveillance system may further send more alert messages to a mobile device if the security surveillance system determines that an incident have yet to be resolved.

At step 622, the hardware processor(s) 602 may execute machine-readable/machine-executable instructions stored in the machine-readable storage media 604 to update the first 3D view of the facility according to the resolution alert. After the security surveillance system has received a resolution alert and determined that an incident has been resolved based on the resolution alert, the security surveillance system may update the first 3D view of the real-time 3D visualization of the facility according to the resolution alert. As an example, if the security surveillance system has received a resolution alert stating that a fire has been extinguished, and has determined that the fire incident has actually been resolved, the security surveillance system may update the real-time 3D visualization of the facility that displays the incident in its accurate location in the facility by removing the fire incident color, symbols, labels, etc. that were displayed in the real-time 3D visualization. Regardless of whether an incident has been resolved, the security surveillance system may continuously update the real-time 3D visualizations of the facility to accurately display the locations of the detected mobile devices, detected facility devices, and the locations of incidents in the facility.

Referring to FIGS. 1-6 collectively, although these illustrate example embodiments with components, elements and circuits partitioned in the depicted manner, it will be appreciated by one of ordinary skill in the art that various components and circuits of SSS 100 (including any one or more elements and subsystems related thereto, personally or collectively) and described herein may be implemented utilizing any form of hardware, software, or a combination thereof. For example, one or more processors, controllers, ASICs, PLAs, PALs, CPLDs, FPGAs, logical components, software routines or other mechanisms, including associated memory, might be used to implement one or more components or circuits in embodiments of SSS 100 (including any one or more elements and subsystems related thereto) described in the present disclosure. In embodiments, the various components and circuits described herein might be implemented as discrete components or the functions and features described can be shared in part or in total among two or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be personally described or claimed as separate components, in various embodiments these features and functionality can be shared among one or more common software and hardware elements, and such description shall not require or imply that separate hardware or software components are used to implement such features or functionality.

Figure 7:
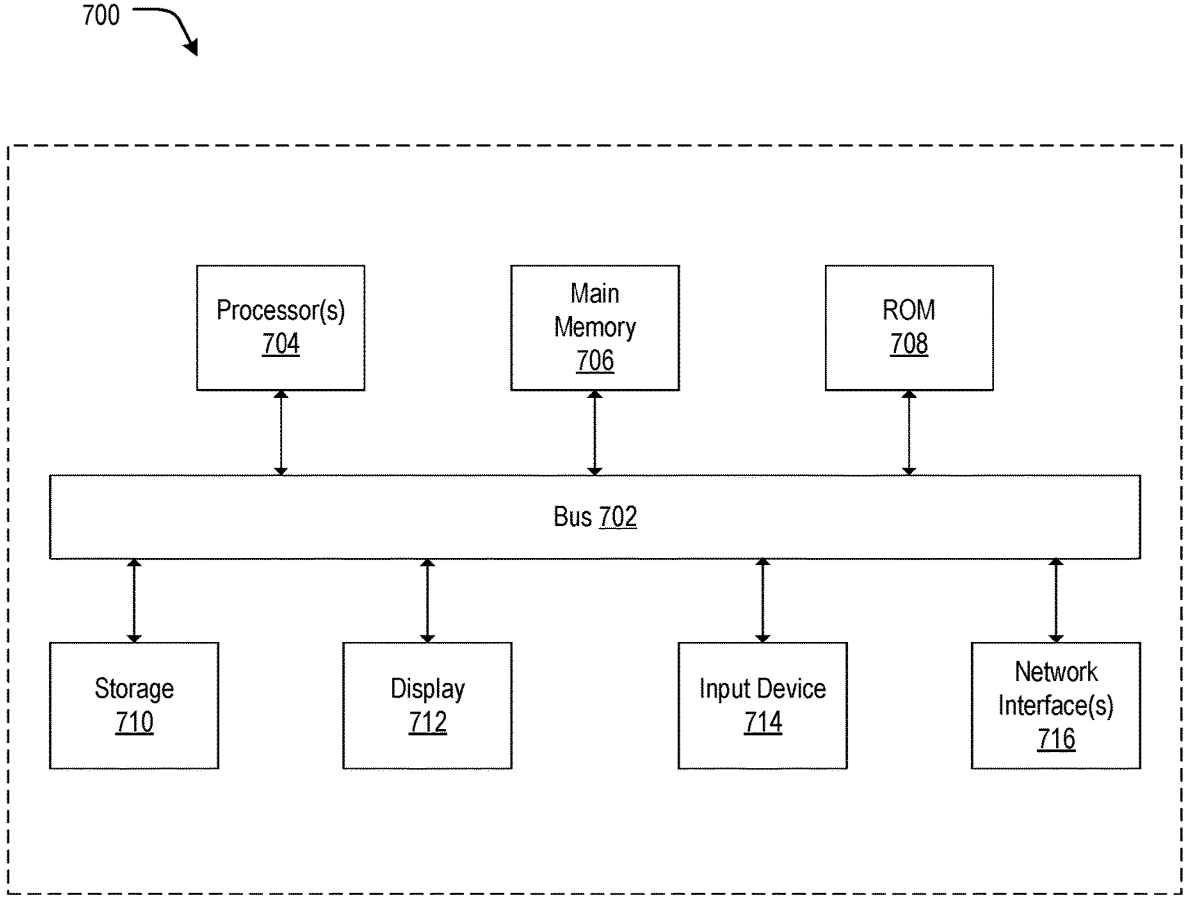
FIG. 7 illustrates a block diagram of an example computer system in which various embodiments of the technology in the present disclosure may be implemented.

As used herein, the term "component" might describe a given unit of functionality that can be performed in accordance with one or more embodiments of the technology disclosed herein. As used herein, a component might describe a given unit of hardware that can be utilized, alone or in conjunction with software, to perform an operation (e.g., a camera component might include a CMOS array, an analog-to-digital converter, a sampling circuit, and software to create a permanent or temporary digital image information, for instance). Thus, as used herein, a component might comprise or be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components, or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be personally described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing component or engine capable of carrying out the functionality described with respect thereto. One such example computing component is shown in FIG. 7. Various embodiments are described in terms of this example computing component 700. After reading this description, it will become apparent to a person skilled in the relevant art how to implement the technology using other computing modules or architectures.

FIG. 7 depicts a block diagram of an example computer component 700 in which various of the embodiments described herein may be implemented. The computer component 700 includes a bus 702 or other communication mechanism for communicating information, one or more hardware processors 704 coupled with bus 702 for processing information. Hardware processor(s) 704 may be, for example, one or more general purpose microprocessors.

The computer component 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer component 700 into a special-purpose machine that is customized to perform the operations specified in the instructions.

The computer component 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer component 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing component 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer component 700 may implement the techniques described herein using customized hard-wired logic, one or more ASICs or FPGAs, firmware and/or program logic which in combination with the computer system causes or programs computer component 700 to be a special-purpose machine. According to one embodiment, the techniques herein are performed by computer component 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer component 700 also includes a network interface 716 (e.g., communications component 226 shown in FIG. 2) coupled to bus 702. Network interface 716 provides a two-way data communication coupling to one or more network links that are connected to one or more local networks. For example, network interface 716 may be an integrated services digital network (ISDN) card, cable modem, satellite modem, or a modem to provide a data communication connection to a corresponding type of telephone line. As another example, network interface 716 may be a local area network (LAN) card to provide a data communication connection to a compatible LAN (or WAN component to communicated with a WAN). Wireless links may also be implemented. In any such implementation, network interface 716 sends and receives electrical, electromagnetic or optical signals that carry digital data streams representing various types of information.

Network interface 716 might be used to allow software and data to be transferred between computing component 700 and external devices. Examples of network interface 716 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via network interface 716 might typically be carried on signals, which can be electronic, electromagnetic (which includes optical) or other signals capable of being exchanged by a given network interface 716. These signals might be provided to network interface 716 via a network link or channel. A network link might carry signals and might be implemented using a wired or wireless communication medium. Some examples of a network link might include a phone line, a cellular link, an RF link, an optical link, a network interface, a local or wide area network, and other wired or wireless communications channels.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through network interface 716, which carry the digital data to and from computer component 700, are example forms of transmission media.

The computer component 700 can send messages and receive data, including program code, through the network(s), network link and network interface 716. In the Internet example, a server might transmit a requested code for an application program through the Internet, the ISP, the local network and the network interface 716.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be personally described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer component 700.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although the disclosed technology is described above in terms of various exemplary embodiments and implementations, it should be understood that the various features, aspects and functionality described in one or more of the person embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of virtual reality security surveillance comprising:

receiving data from at least one facility device in a facility;

generating a virtual reality map of the facility based on the received data;

displaying a first three dimensional (3D) view of the facility;

determining locations of mobile devices in the facility;

detecting a first incident occurred in the facility;

sending an alert message to a first mobile device of the mobile devices comprising a first notification that a first responder is enroute to the first incident;

displaying a second 3D view of a surrounding area of the first mobile device;

receiving a resolution alert, wherein the resolution alert comprise a second notification that the first incident has been resolved; and updating the first 3D view of the facility according to the resolution alert.

2. The method of claim 1, wherein the first 3D view of the facility comprises a first real-time image of the facility, a person in the facility, and an incident occurring in the facility.

3. The method of claim 1, wherein the second 3D view of the surrounding area of the first mobile device comprises a second real-time image presenting an area layout of the surrounding area, a first location of the first mobile device, and any persons and any objects in the surrounding area of the first mobile device.

4. The method of claim 1, wherein the facility comprises a campus, a building, an area, a zone, and a room.

5. The method of claim 1, wherein determining the locations of the mobile devices comprises:

detecting a signal from each of the mobile devices;

determining a location for each of the mobile devices based on the respective detected signal;

inserting, on the first 3D view of the facility, an identification marker on each determined location; and labeling each identification marker with identification information associated with the respective mobile device.

6. The method of claim 5, wherein each of the mobile devices is associated with a different person and the first mobile device of the mobile devices comprises a first identification information of a first person.

7. The method of claim 5, wherein the location for the first mobile device of the mobile devices comprises a real-time location of the first mobile device according to Global Positioning System (GPS), latitude, longitude, and altitude measurements of the first mobile device.

8. The method of claim 5, wherein labeling each identification marker with identification information associated with the respective mobile device comprises:

determining that the first mobile device of the mobile devices is registered in an identification database;

if the first mobile device is registered, extracting a first identification information associated with the first mobile device from the identification database;

if the first mobile device is not registered, sending a request message to the first mobile device requesting to obtain the first identification information associated with the first mobile device;

if an authorized response message is received approving the request message, obtaining the first identification information associated with the first mobile device;

if a rejection response message is received disapproving the request message, generating a temporary identification information for the first identification information;

storing the first identification information in the identification database; and displaying the first identification information on a first identification marker associated with the first mobile device.

9. The method of claim 1, wherein the alert message comprises a third notification of the first incident occurring in close proximity of the first mobile device.

10. The method of claim 1, wherein the alert message comprises directions to escape the first incident occurring in close proximity of the first mobile device.

11. The method of claim 1, further comprising:

detecting a distress signal from the first mobile device, wherein the distress signal comprises a fourth notification requesting help by a second person of the first mobile device; and sending an incident alert to a second responder according to the detected distress signal, wherein the incident alert comprise a route to the location of the first mobile device, first identification information of the second person associated with the first mobile device, and situational information of the first incident occurring in close proximity to the first mobile device.

12. A virtual reality security surveillance system, comprising:

one or more processors; and a memory storing instructions that, when executed by the one or more processors, cause the virtual reality security surveillance system to perform operations comprising:

receiving data from at least one facility device in a facility;

generating a virtual reality map of the facility based on the received data;

displaying a first three dimensional (3D) view of the facility;

determining locations of mobile devices in the facility;

detecting a first incident occurred in the facility;

sending an alert message to a first mobile device of the mobile devices comprising a first notification that a first responder is enroute to the first incident;

displaying a second 3D view of a surrounding area of the first mobile device;

receiving a resolution alert, wherein the resolution alert comprises a second notification that the first incident has been resolved; and updating the first 3D view of the facility according to the resolution alert.

13. The virtual reality security surveillance system of claim 12, wherein determining the locations of one or more mobile devices comprises:

detecting a signal from each of the mobile devices;

determining a location for each of the mobile devices based on the respective detected signal;

inserting, on the first 3D view of the facility, an identification marker on each determined location; and labeling each identification marker with identification information associated with the respective mobile device.

14. The virtual reality security surveillance system of claim 13, wherein labeling each identification marker with identification information associated with the respective mobile device comprises:

determining that the first mobile device of the mobile devices is registered in an identification database;

if the first mobile device is registered, extracting a first identification information associated with the first mobile device from the identification database;

if the first mobile device is not registered, sending a request message to the first mobile device requesting to obtain the first identification information associated with the first mobile device;

if an authorized response message is received approving the request message, obtaining the first identification information associated with the first mobile device;

if a rejection response message is received disapproving the request message, generating a temporary identification information for the first identification information;

storing the first identification information in the identification database; and displaying the first identification information on a first identification marker associated with the first mobile device.

15. The virtual reality security surveillance system of claim 12, wherein the instructions cause the virtual reality security surveillance system to further perform operations comprising:

detecting a distress signal from the first mobile device, wherein the distress signal comprises a third notification requesting help by a first person of the first mobile device; and sending an incident alert to a second responder according to the detected distress signal, wherein the incident alert comprises a route to the location of the first mobile device, first identification information of the first person associated with the first mobile device, and situational information of the first incident occurring in close proximity to the first mobile device.

16. The virtual reality security surveillance system of claim 12, wherein the alert message comprises a fourth notification of the first incident occurring in close proximity of the first mobile device.

17. The virtual reality security surveillance system of claim 12, wherein the alert message comprises directions to escape the first incident occurring in close proximity of the first mobile device.

18. A non-transitory computer-readable storage medium for a virtual reality security surveillance system, configured with instructions executable by one or more processors to cause the one or more processors to perform operations comprising:

receiving data from at least one facility device in a facility;

generating a virtual reality map of the facility based on the received data;

displaying a first three-dimensional (3D) view of the facility;

determining locations of mobile devices in the facility;

detecting a first incident occurred in the facility;

sending an alert message to a first mobile device of the mobile devices comprising a first notification that a first responder is enroute to the first incident;

displaying a second 3D view of a surrounding area of the first mobile device;

receiving a resolution alert, wherein the resolution alert comprises a second notification that the first incident has been resolved; and updating the first 3D view of the facility according to the resolution alert.

19. The non-transitory computer-readable storage medium of claim 18, wherein determining the locations of the mobile devices comprises:

detecting a signal from each of the mobile devices;

determining a location for each of the mobile devices based on the respective detected signal;

inserting, on the first 3D view of the facility, an identification marker on each determined location; and labeling each identification marker with identification information associated with the respective mobile device.

20. The non-transitory computer-readable storage medium of claim 19, wherein labeling each identification marker with identification information associated with the respective mobile device comprises:

determining that the first mobile device of the mobile devices is registered in an identification database;

if the first mobile device is registered, extracting a first identification information associated with the first mobile device from the identification database;

if the first mobile device is not registered, sending a request message to the first mobile device requesting to obtain the first identification information associated with the first mobile device;

if an authorized response message is received approving the request message, obtaining the first identification information associated with the first mobile device;

if a rejection response message is received disapproving the request message, generating a temporary identification information for the first identification information;

storing the first identification information in the identification database; and displaying the first identification information on a first identification marker associated with the first mobile device.

* * * * *